US012718074B2

(12) United States Patent
Kosko et al.

(10) Patent No.: US 12,718,074 B2
(45) Date of Patent: Aug. 25, 2026

(54) BLOCKING NEURAL NETWORKS FOR HIGH CAPACITY

(71) Applicant: UNIVERSITY OF SOUTHERN CALIFORNIA, Los Angeles, CA (US)

(72) Inventors: Bart Kosko, Los Angeles, CA (US); Olaoluwa Adigun, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 637 days.

(21) Appl. No.: 18/024,379

(22) PCT Filed: Sep. 2, 2021

(86) PCT No.: PCT/US2021/048895

§ 371 (c)(1),
(2) Date: Mar. 2, 2023

(87) PCT Pub. No.: WO2022/051518

PCT Pub. Date: Mar. 10, 2022

(65) Prior Publication Data

US 2023/0316050 A1 Oct. 5, 2023

Related U.S. Application Data

(60) Provisional application No. 63/073,602, filed on Sep. 2, 2020.

(51) Int. Cl.
*G06N 3/048* (2023.01)
*G06N 3/082* (2023.01)

(52) U.S. Cl.
CPC ............ *G06N 3/048* (2023.01); *G06N 3/082* (2013.01)

(58) Field of Classification Search
CPC .............................. G06N 3/048; G06N 3/082
(Continued)

(56) References Cited

U.S. PATENT DOCUMENTS 8,103,606 B2 * 1/2012 Moussa ................ G06N 3/063 706/31
10,948,467 B2 3/2021 Gao et al.
(Continued)

FOREIGN PATENT DOCUMENTS

WO 2019/218395 A1 11/2019

OTHER PUBLICATIONS

Kawato et al., "A hierarchical neural-network model for control and learning of voluntary movement", Biol. Cybern. 57, 169-185 (1987), 1987 (Year: 1987).*

(Continued)

*Primary Examiner* — Tsu-Chang Lee
(74) *Attorney, Agent, or Firm* — Brooks Kushman P.C.

(57) ABSTRACT

A neural network architecture for classifying input data is provided. The neural network architecture includes an input block, an output block, and at least one hidden block interposed between the input block and the output block. Characteristically, each neuron of an input block output neuron layer, an output block input neuron layer, an output block output neuron layer, a hidden block input neuron layer and a hidden block output neuron layer, independently applies a logistic activation function or an activation function that is the sum of a logistic activation function and a linear term or an activation function that is the sum of a logistic activation function and a quasi-linear term.

13 Claims, 26 Drawing Sheets

(58) Field of Classification Search
USPC .......................................................... 706/15
See application file for complete search history.

(56) References Cited

U.S. PATENT DOCUMENTS

| | | | |
|---|---|---|---|
| 2015/0161232 A1 | 6/2015 | Kosko et al. | |
| 2019/0050709 A1* | 2/2019 | Yang | G06F 18/23 |
| 2020/0174864 A1 | 6/2020 | Bhardwaj | |
| 2020/0186796 A1* | 6/2020 | Mukherjee | H04N 19/107 |
| 2021/0146623 A1 | 5/2021 | Babu et al. | |

OTHER PUBLICATIONS

Jordan et al., "Modular and hierarchical learning systems", in the Handbook of brain theory and neural networks, Cambridge, MA, MIT Press, 1995 (Year: 1995).*

Adigun, O. et al., "High Capacity Neural Classifiers with Logistics Neurons and Random Coding," 2020 Int'l Joint Conference on Neural Networks (2020), pp. 1-9.

Int'l Search Report & Written Opinion dated Dec. 7, 2021 for PCT Appn. No. PCT/US21/48895.

* cited by examiner $M = 20$ $M = 60$ $\mathbf{M} = 100$

Algorithm 1 : Random coding search w.r.t. the mean $\mu_c$ of the similarity measure with bipolar codewords.

Require: Code length $M$, number of codewords $K$, number of search iterations $T$, and sampling probability $p$.

1: $\mu_c{}^* = 0.0$
2: for $t = 1$ to $T$ do
3: Pick $K$ distinct codewords of length $M$:
4: for $k = 1$ to $K$ do
5: Randomly generate a codeword from $\{-1, 1\}^M$:
6: if $k == 1$ then
7: Generate a $(1 \times M)$ vector $\mathbf{C}^{(t)}$ by picking $M$ samples with replacement from $\{-1, 1\}$ with the probability $p$.
8: else
9: $search\_status$ = True
10: while $search\_status$ == True do
11: Generate a $(1 \times M)$ vector $\mathbf{c}_k$ by picking $M$ samples with replacement from $\{-1, 1\}$ with the probability $p$.
12: Compute the inter-codeword similarity measures between $\mathbf{c}_k$ and $\mathbf{C}^{(t-1)}$ :

$$\boldsymbol{d}_k = \mathbf{C}^{(t-1)}\, \mathbf{c}_k{}^T.$$

13: Drop $\mathbf{c}_k$ if there is a copy in $\mathbf{C}^{(t-1)}$.
14: if $\max(\boldsymbol{d}_k) < M$ then
15: $\mathbf{C}^{(t)} \Leftarrow$ Stack $\mathbf{c}_k$ and $\mathbf{C}^{(t-1)}$ to form a $(k \times M)$ matrix.
16: $search\_status$ = False
17: end if
18: end while
19: end if
20: end for
21: Compute the mean $\mu_c^{(t)}$ for code $\mathbf{C}^{(t)}$ using (18).
22: if $(t == 1)$ or $(\mu_c^* < \mu_c^{(t)})$ then
23: Update the best code $\mathbf{C}^*$ and best mean $\mu_c{}^*$ .
24: end if
25: end for

*Fig. 15*

Algorithm 2 : Deep-sweep training algorithm.

Require: Learning rate $\eta$, batch size $M$, training epochs $N$, iterations per epoch $R$, number of blocks $B$, size of blocks $\{L^{(1)}, \ldots, L^{(B)}\}$, and start of fine-tuning stage $n_0$.

Require: Initial weights for the blocks $\Theta_1^{(0)}, \Theta_2^{(0)}, \ldots, \Theta_B^{(0)}$ and the training samples $\{\mathbf{x}_j, \mathbf{t}_j\}_{j=1}^{J}$.

1: $num\_of\_iters = N \times R$
2: for $r = 1$ to $num\_of\_iters$ do
3: Select a batch of $M$ samples $\{\mathbf{x}_m, \mathbf{t}_m\}_{m=1}^{M}$.
4: if $r \leq n_0$ then
5: for $b = 1$ to $B$ do
6: Compute the output activatiom $\mathbf{a}_m^{t(b)}$ for input $\mathbf{x}_m$.
7: Compute the pre-training error $E^{(b)}$:

$$E^{(b)} = -\frac{1}{M}\sum_{m=1}^{M}\Big[(1+\mathbf{t}_m)^T \log\big(1+\mathbf{a}_m^{t(b)}\big) + (1-\mathbf{t}_m)^T \log\big(1-\mathbf{a}_m^{t(b)}\big)\Big].$$

8: Update the block parameter $\Theta_b$ :

$$\Theta_b^{(r+1)} = \Theta_b^{(r)} - \eta \nabla_{\Theta_b} E^{(b)}\Big|_{\Theta_b = \Theta_b^{(r)}}.$$

9: end for
10: else
11: Stack the $B$ blocks into a single deep network.
12: for $b = 1$ to $B$ do
13: Compute the output activation $\tilde{\mathbf{a}}_m^{t(b)}$ for input $\mathbf{x}_m$.
14: Compute the deep-sweep error $E_{ds}^{(b)}$:

$$E_{ds}^{(b)} = -\frac{1}{M}\sum_{m=1}^{M}\Big[(1+\mathbf{t}_m)^T \log\big(1+\tilde{\mathbf{a}}_m^{t(b)}\big) + (1-\mathbf{t}_m)^T \log\big(1-\tilde{\mathbf{a}}_m^{t(b)}\big)\Big].$$

15: end for
16: Compute the joint deep-sweep error $E_{ds}$ using equation (24).
17: Update the all the weights as follows:

$$\Theta^{(r+1)} = \Theta^{(r)} - \eta \nabla_{\Theta} E_{ds}\Big|_{\Theta = \Theta^{(r)}}.$$

18: end if
19: end for

*Fig. 16*

TABLE I: Output logistic activations outperformed softmax activations for the same number of output neurons. We used $K$ binary basis vectors from the Boolean $\{0,1\}^K$ as the codewords with softmax or binary logistic activations. We used $K$ bipolar basis vectors from the bipolar cube $\{-1,1\}^K$ as the codewords for bipolar logistic outputs. Ordinary backpropagation trained the classifiers. $K = 100$ for the CIFAR-100 dataset and $K = 256$ for the Caltech-256 dataset.

| No. of Hidden Layers | CIFAR-100 | | | Caltech-256 | | |
|---|---|---|---|---|---|---|
| | *Softmax* | *Binary Logistic* | *Bipolar Logistic* | *Softmax* | *Binary Logistic* | *Bipolar Logistic* |
| 3 layers | 30.38 ± 1.42% | 32.92 ± 0.44% | 32.65 ± 0.83% | 17.01 ± 0.92% | 19.43 ± 0.73% | 19.06 ± 1.00% |
| 5 layers | 29.04 ± 0.74% | 32.47 ± 0.73% | 32.19 ± 0.85% | 15.82 ± 0.74% | 18.59 ± 0.93% | 17.93 ± 0.70% |
| 7 layers | 27.80 ± 0.74% | 29.64 ± 1.23% | 29.89 ± 0.78% | 15.19 ± 0.70% | 18.08 ± 0.81% | 17.61 ± 0.91% |
| 9 layers | 26.58 ± 0.61% | 26.77 ± 1.12% | 27.47 ± 0.68% | 15.84 ± 0.74% | 17.16 ± 0.78% | 17.25 ± 0.85% |

Fig. 17

TABLE II: Random bipolar coding scheme with neural classifiers. The classifiers trained with random bipolar codewords from Algorithm 1 and used 5 hidden layers per model. We used code length $M = 30$ with the CIFAR-100 dataset and code length $M = 80$ with the Caltech-256 dataset. We used probability $p$ to pick $M$ samples with replacement from $\{-1, 1\}$ when choosing the codewords. The mean $\mu_c$ of the similarity measure decreased as $p$ increased from 0 to 0.5. The classification accuracy increased as the value $\mu_c$ decreased for a fixed value of $M$.

| Dataset | Probability $p$ | Mean $\mu_c$ | Accuracy |
|---|---|---|---|
| CIFAR-100 | 0.1000 | 16.9915 | $16.12 \pm 0.31\%$ |
| | 0.1250 | 14.6145 | $17.90 \pm 0.43\%$ |
| | 0.1500 | 12.4865 | $20.25 \pm 0.60\%$ |
| | 0.1875 | 9.9794 | $20.27 \pm 0.47\%$ |
| | 0.2125 | 8.2638 | $21.08 \pm 0.46\%$ |
| | 0.2250 | 7.7931 | $22.80 \pm 0.54\%$ |
| | 0.2375 | 7.1180 | $22.75 \pm 0.76\%$ |
| | 0.2750 | 5.6162 | $23.52 \pm 1.03\%$ |
| | 0.3500 | 4.4537 | $24.13 \pm 0.61\%$ |
| | 0.5000 | 4.1923 | $24.80 \pm 0.59\%$ |
| Caltech-256 | 0.1125 | 45.969 | $9.392 \pm 0.54\%$ |
| | 0.1875 | 28.867 | $10.18 \pm 1.04\%$ |
| | 0.2125 | 24.382 | $10.42 \pm 0.50\%$ |
| | 0.2250 | 22.205 | $11.10 \pm 1.08\%$ |
| | 0.2375 | 20.292 | $11.69 \pm 0.54\%$ |
| | 0.2500 | 18.293 | $12.53 \pm 0.86\%$ |
| | 0.3000 | 12.189 | $12.44 \pm 0.72\%$ |
| | 0.3500 | 8.7057 | $14.24 \pm 0.51\%$ |
| | 0.5000 | 7.0074 | $15.97 \pm 0.62\%$ |

Fig.18

TABLE III: Using the bipolar codewords with small codeword length and logistic outputs gave a classifier accuracy comparable to that of using softmax outputs and $K$ binary basis vectors from $\{0,1\}^K$. The deep neural classifiers trained with bipolar codewords from Algorithm 1 on the CIFAR-100 and Caltech-256 datasets. We compared the performance of these classifiers to the accuracy of the models trained with $K$-basis vectors and softmax activations (from Table I). Training models on the CIFAR-100 dataset with bipolar codewords of length $M = 40 = 0.4K$ achieved between 88% – 90% of the accuracy obtained from using 100 binary basis vectors and softmax outputs. Training models on Caltech-256 dataset with bipolar codewords of length $M = 80 = 0.3125K$ achieved between 84% – 101% of the accuracy obtained from using the 256 binary basis vectors and softmax outputs (from Table I). It outperformed softmax activations in some cases with the Caltech-256 dataset.

| Dataset | Code Length $M$ | Best mean $\mu_c^*$ | Classification Accuracy | | |
|---|---|---|---|---|---|
| | | | *3 Hidden Layers* | *5 Hidden Layers* | *7 Hiddden Layers* |
| CIFAR-100 | 8 | 2.1156 | 16.68 ± 0.70% | 17.55 ± 0.46% | 17.44 ± 0.64% |
| | 10 | 2.3733 | 19.63 ± 0.45% | 20.28 ± 0.47% | 19.57 ± 0.55% |
| | 20 | 3.3774 | 24.24 ± 0.54% | 23.43 ± 0.80% | 23.08 ± 0.49% |
| | 30 | 4.1923 | 25.80 ± 0.94% | 24.86 ± 0.59% | 23.78 ± 0.59% |
| | 40 | 4.8158 | 26.98 ± 0.92% | 25.86 ± 0.95% | 24.82 ± 0.47% |
| | 50 | 5.3830 | 27.61 ± 0.82% | 26.33 ± 0.60% | 25.03 ± 0.54% |
| | 60 | 5.9079 | 27.63 ± 0.74% | 26.52 ± 0.84% | 25.57 ± 0.63% |
| | 70 | 6.3766 | 27.78 ± 0.64% | 26.82 ± 0.71% | 25.23 ± 0.80% |
| | 80 | 6.8505 | 27.62 ± 0.99% | 26.41 ± 0.79% | 25.14 ± 1.08% |
| | 90 | 7.2509 | 27.86 ± 0.82% | 26.84 ± 0.52% | 25.26 ± 0.56% |
| | 100 | 7.6444 | 27.80 ± 0.84% | 26.47 ± 1.11% | 25.01 ± 0.73% |
| Caltech-256 | 10 | 2.4287 | 9.78 ± 1.25% | 11.05 ± 0.95% | 11.03 ± 0.67% |
| | 20 | 3.4642 | 12.56 ± 1.49% | 13.78 ± 1.02% | 13.70 ± 0.66% |
| | 50 | 5.5320 | 13.82 ± 1.17% | 15.63 ± 1.05% | 14.99 ± 0.81% |
| | 80 | 7.0074 | 14.28 ± 1.27% | 15.97 ± 0.62% | 15.43 ± 0.59% |
| | 100 | 7.8234 | 14.13 ± 1.69% | 15.94 ± 0.75% | 15.42 ± 0.93% |
| | 150 | 9.5934 | 14.36 ± 1.55% | 16.22 ± 0.94% | 15.39 ± 0.91% |
| | 200 | 11.101 | 14.36 ± 1.69% | 16.25 ± 0.55% | 16.06 ± 0.58% |
| | 250 | 12.401 | 14.06 ± 1.09% | 16.36 ± 1.12% | 16.70 ± 0.97% |

*Fig. 19*

TABLE IV: Deep-sweep versus ordinary backpropagation learning for deep neural classifiers and basis vectors as the codewords. We compared the effect of the algorithms on the classification accuracy of the classifiers. We used the bipolar basis vectors from $\{-1,1\}^K$ as the codewords. Deep-sweep method outperformed the ordinary BP with deep neural classifiers. The deep-sweep benefit increased with an increase in the depth of the classifiers.

| No. of Layers | No. of Blocks | Layers per Block | Deep-sweep | Classification Accuracy | |
|---|---|---|---|---|---|
| | | | | *CIFAR-100* | *Caltech 256* |
| 5 layers | 1 | 5 | No | 32.65 ± 0.83% | 19.06 ± 1.00% |
| | 2 | 3 | Yes | 30.62 ± 0.41% | 18.59 ± 0.66% |
| 7 layers | 1 | 7 | No | 32.19 ± 0.85% | 17.93 ± 0.70% |
| | 2 | 4 | Yes | 32.69 ± 0.70% | 20.11 ± 1.22% |
| | 3 | 3 | Yes | 27.95 ± 0.69% | 16.25 ± 0.65% |
| 9 layers | 1 | 9 | No | 29.89 ± 0.78% | 17.61 ± 0.91% |
| | 2 | 5 | Yes | 32.20 ± 0.32% | 19.75 ± 0.83% |
| 11 layers | 1 | 11 | No | 27.47 ± 0.78% | 17.25 ± 0.85% |
| | 2 | 6 | Yes | 30.68 ± 0.57% | 18.77 ± 1.19% |
| 13 layers | 1 | 13 | No | 25.55 ± 1.09% | 16.40 ± 0.57% |
| | 3 | 5 | Yes | 30.76 ± 0.74% | 18.47 ± 0.56% |

*Fig. 20*

TABLE V: Finding the best block size with the deep-sweep algorithm. We trained deep neural classifiers with the bipolar basis vectors from $\{-1, 1\}^K$ as the codewords. The relationship between the classification accuracy and the block size with a fixed number of blocks $B$ follows an inverted U-shape.

| No. of blocks | No. of layers per block | Classification Accuracy | |
|---|---|---|---|
| | | *CIFAR-100* | *Caltech 256* |
| 2 blocks | 3 layers | 30.62 ± 0.41% | 18.59 ± 0.66% |
| | 4 layers | 32.69 ± 0.70% | 20.11 ± 1.22% |
| | 5 layers | 32.20 ± 0.32% | 19.75 ± 0.83% |
| | 6 layers | 30.68 ± 0.57% | 18.77 ± 1.19% |
| 3 blocks | 3 layers | 27.95 ± 0.69% | 16.25 ± 0.64% |
| | 4 layers | 31.84 ± 0.84% | 18.76 ± 0.60% |
| | 5 layers | 30.76 ± 0.74% | 18.47 ± 0.61% |
| 4 blocks | 3 layers | 27.94 ± 0.62% | 13.96 ± 0.51% |
| | 4 layers | 28.45 ± 0.56% | 16.97 ± 1.37% |
| | 5 layers | 25.80 ± 0.53% | 16.64 ± 0.80% |
| 5 blocks | 3 layers | 26.28 ± 0.88% | 11.79 ± 1.02% |
| | 4 layers | 29.69 ± 1.12% | 15.06 ± 0.89% |
| | 5 layers | 23.15 ± 1.86% | 14.47 ± 1.00% |

*Fig. 21*

BLOCKING NEURAL NETWORKS FOR HIGH CAPACITY

CROSS-REFERENCE TO RELATED APPLICATIONS

This application is the U.S. national phase of PCT Appln. No. PCT/US2021/048895 filed Sep. 2, 2021 which claims the benefit of U.S. provisional application Ser. No. 63/073,602 filed Sep. 2, 2020, the disclosures of which are hereby incorporated in their entireties by reference herein.

TECHNICAL FIELD

The present invention is related to high-capacity neural network architectures.

BACKGROUND

Almost all deep classifiers map input patterns to K output softmax neurons. So they code the K pattern classes with K unit bit vectors and thus with 1-in-K coding. The softmax output layer has the likelihood structure of a one-shot multinomial probability or the single roll of K-sided die and thus, its log-likelihood is the negative of the cross-entropy [1], [2]. This softmax structure produces an output probability vector and so restricts its coding options to the K unit bit vectors of the K-dimensional unit hypercube $[0,1]^K$. Although softmax neurons work well for many classifier applications, they are somewhat limited when the number of classifications becomes large.

Accordingly, there is a need for improved neural network classifiers for situations where the number of classifications is large.

SUMMARY

In at least one aspect, a neural network architecture is implemented by a computing device for classifying input data x into K classifications or for neural network regression. The neural network architecture includes an input block, an output block, and at least one hidden block interposed between the input block and the output block. The input block includes an input block input neuron layer, an input block hidden neuron layer, and an input block output neuron layer. The output block includes an output block input neuron layer, an output block hidden neuron layer, and an output block output neuron layer. The at least one hidden block includes a hidden block input neuron layer, a hidden block hidden neuron layer, and a hidden block output neuron layer. Characteristically, each neuron of the input block output neuron layer, the output block input neuron layer, output block output neuron layer, the hidden block input neuron layer and the hidden block output neuron layer, independently applies a logistic activation function or an activation function that is the sum of a logistic activation function and a linear term or an activation function that is the sum of a logistic activation function and a quasi linear term. Typically, the neural network architecture is encoded in non-transitory computer memory.

In another aspect, a network with logistic output neurons and random logistic coding (e.g., random bipolar coding) can store the same number K of patterns as a softmax classifier, but with a smaller number M of output neurons is provided. The logistic network's classification accuracy falls as M becomes much smaller than K. This implies that a properly coded logistic network can store far more patterns with similar accuracy than a softmax network can with the same number of outputs. We further show that randomly encoded logistic blocks lead to still more efficient deep networks.

In another aspect, pretrained blocks are formed by pretraining the input block, the output block, and the at least one hidden block before inclusion in the neural network architecture. Therefore, blocks can be added or deleted as needed.

In another aspect, the pretrained blocks are assembled into the neural network architecture with the assembled neural network architecture being trained by deep-sweep training.

In another aspect, the blocking neural network architecture is applied to automatic image annotation: This is a task that involves using a computer to assign suitable descriptions or keywords (e.g., out of millions of possible options) to digital images. It applies in image retrieval systems that organize, locate, and document images of interest. In a refinement, automatic image annotation can assist e-commerce companies (e.g., Amazon, Alibaba, and eBay) that annotate and organize the image of billions of products at their storage facility. In another refinement, automatic image annotation can assist search engines (e.g., Google, Bing, and DuckDuckGo) in organizing images on their platforms for the user.

In another aspect, the blocking neural network architecture can be applied to Medical Diagnostics. In this application, a computer is used to diagnose diseases. The computer takes in a patient's information (including physiological measurements, environmental data, and genetic data) and then predicts the most likely disease. The size K of possible diseases, in this case, is very large and so is suitable for a high-capacity classifier.

In another aspect, the blocking neural network architecture can be applied to a recommendation system. In this application, a computer processes a user's information and then predicts the user's most preferred items. The number K of possible items can be huge and will only grow as more searchable databases emerge. Examples include online dating platforms, social media platforms, and e-commerce. Social media platforms such as Facebook, Twitter, and Instagram use recommendation systems to suggest the best set of news or posts to users out of millions of possible posts on their platform. E-commerce companies such as Amazon, Alibaba, Netflix, and E-Bay use this system to suggest the best item to users from millions of available items on their platform. Online dating platforms such as Tinder use this system to connect a user to the best suitor out of millions of possible suitors on their platform.

In another aspect, the blocking neural network architecture can be applied to a biometric recommendation system. These systems use a computer to identify a person based on physiological and behavioral characteristics such as fingerprint, height, typing style on the keyboard, body movement, color, and size of the iris. The system identifies, verifies, or classifies a person to one out of millions of possible users. Examples include a biometric system for identifying people coming into the United States at airports or border points of entry. Here K can be in the billions.

In another aspect, the blocking neural network architecture can be applied to artificial olfactory systems: These "smell" or "sniffer" systems use a computer to mimic the human olfactory system. There are millions of possible smells in this case. The huge size K of possible smells dictates the use of high-capacity classifiers. This system can find its application in medical health care when it serves as a substitute to the human nose when people are suffering from an anosmia disorder. It can also apply to industries to detect hazardous gases and chemical leakages, and even bomb threats.

In another aspect, the blocking neural network architecture can be applied to genotype classification. Genotype classifiers are highly efficient for classifying organisms, but they scale poorly for the analysis of a large number of species. The high-capacity classifiers set forth herein can extend genome-based classification to solve this problem. A computer extracts the genotype information and then classifies the species to one of the possible classes based on the information.

In another aspect, neural networks with logistic output neurons and random codewords are demonstrated to store and classify far more patterns than those that use softmax neurons and 1-in-K encoding. Logistic neurons can choose binary codewords from an exponentially large set of codewords. Random coding picks the binary or bipolar codewords for training such deep classifier models. This method searched for the bipolar codewords that minimized the mean of an inter-codeword similarity measure. The method uses blocks of networks with logistic input and output layers and with few hidden layers. Adding such blocks gave deeper networks and reduced the problem of vanishing gradients. It also improved learning because the input and output neurons of an interior block must equal the input pattern's code word. Deep-sweep training of the neural blocks further improved the classification accuracy—the networks trained on the CIFAR-100 and the Caltech-256 image datasets. Networks with 40 output logistic neurons and random coding achieved much of the accuracy of 100 softmax neurons on the CIFAR-100 patterns. Sufficiently deep random-coded networks with just 80 or more logistic output neurons had better accuracy on the Caltech-256 dataset than did deep networks with 256 softmax output neurons.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein:

FIG. 15: Algorithm 1. Random coding search w.r.t. the mean $\mu_c$ of the similarity measure with bipolar codewords. It should be appreciated that Algorithm 1 also extends to binary codes.

FIG. 16: Algorithm 2. Deep-sweep training algorithm.

FIG. 17: TABLE I. Output logistic activations outperformed softmax activations for the same number of output neurons. We used K binary basis vectors from the Boolean $\{0, 1\}^K$ as the codewords with softmax or binary logistic activations. We used K bipolar basis vectors from the bipolar cube $\{-1, 1\}^K$ as the codewords for bipolar logistic outputs. Ordinary backpropagation trained the classifiers. K=100 for the CIFAR-100 dataset and K=256 for the Caltech-256 dataset.

FIG. 18: TABLE II. Random bipolar coding scheme with neural classifiers. The classifiers trained with random bipolar codewords from Algorithm 1 and used 5 hidden layers per model. We used code length M=30 with the CIFAR-100 dataset and code length M=80 with the Caltech-256 dataset. We used probability p to pick M samples with replacement from $\{-1, 1\}$ when choosing the codewords. The mean $\mu_c$ of the similarity measure decreased as p increased from 0 to 0.5. The classification accuracy increased as the value $\mu_c$ decreased for a fixed value of M.

FIG. 19: TABLE III. Using the bipolar codewords with small codeword length and logistic outputs gave a classifier accuracy comparable to that of using softmax outputs and K binary basis vectors from $\{0, 1\}^K$. The deep neural classifiers trained with bipolar codewords from Algorithm 1 on the CIFAR-100 and Caltech-256 datasets. We compared the performance of these classifiers to the accuracy of the models trained with K-basis vectors and softmax activations (from Table I). Training models on the CIFAR-100 dataset with bipolar codewords of length M=40=0.4K achieved between 88%-90% of the accuracy obtained from using 100 binary basis vectors and softmax outputs. Training models on Caltech-256 dataset with bipolar codewords of length M=80=0.3125K achieved between 84%-101% of the accuracy obtained from using the 256 binary basis vectors and softmax outputs (from Table I). It outperformed softmax activations in some cases with the Caltech-256 dataset.

FIG. 20: TABLE IV. Deep-sweep versus ordinary backpropagation learning for deep neural classifiers and basis vectors as the codewords. We compared the effect of the algorithms on the classification accuracy of the classifiers. We used the bipolar basis vectors from $\{-1, 1\}^K$ as the codewords. Deep-sweep method outperformed the ordinary BP with deep neural classifiers. The deep-sweep benefit increased with an increase in the depth of the classifiers.

FIG. 21: TABLE V. Finding the best block size with the deep-sweep algorithm. We trained deep neural classifiers with the bipolar basis vectors from $\{-1, 1\}^K$ as the codewords. The relationship between the classification accuracy and the block size with a fixed number of blocks B follows an inverted U-shape.

DETAILED DESCRIPTION

Figure 1:
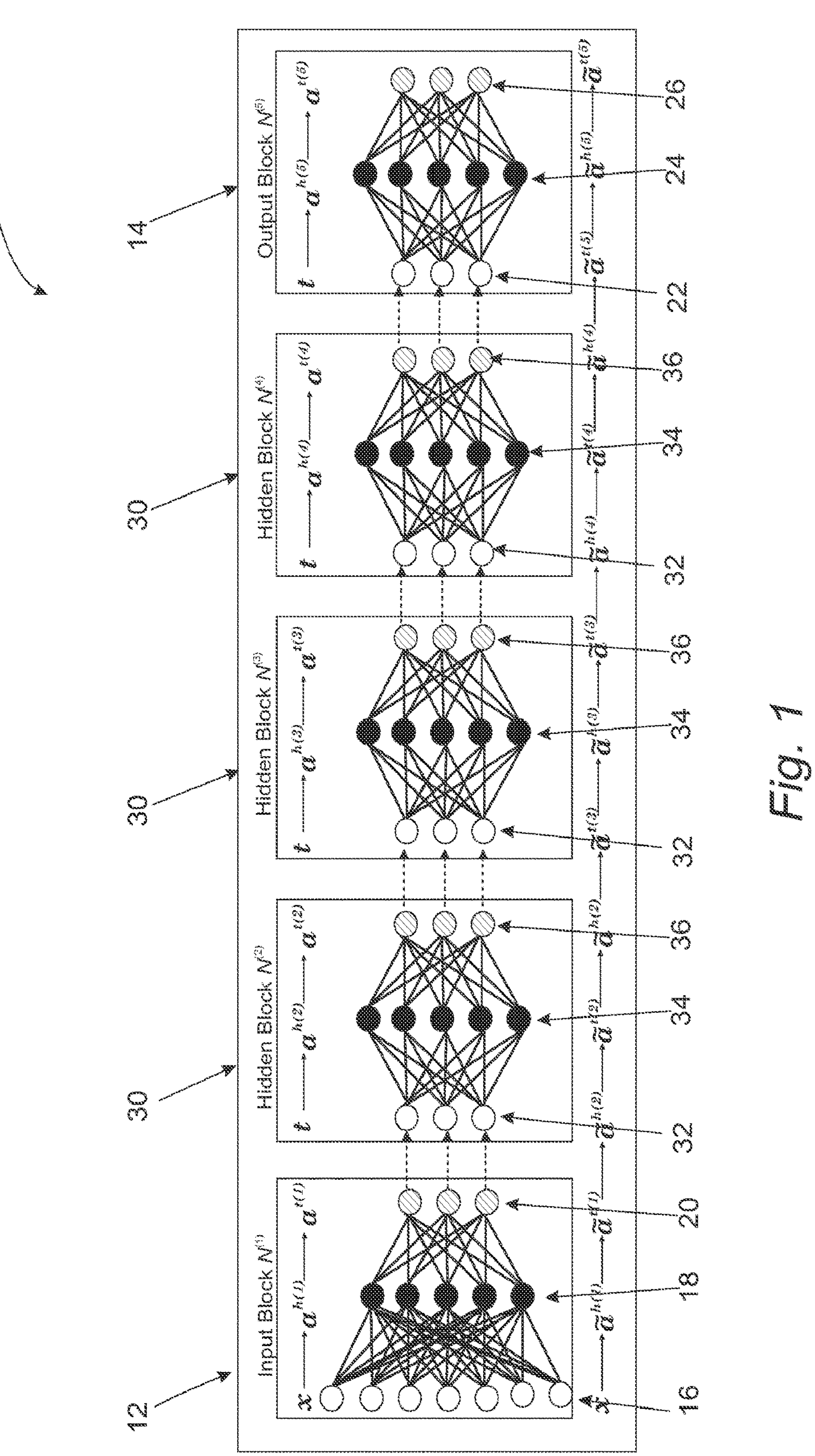
FIG. 1. Modular architecture of a deep block neural network. The deep-sweep training method in Algorithm 1 used blocking to break a deep neural network into small multiple blocks. The network had an input block $N^{(1)}$, three hidden blocks $\{N^{(2)}, N^{(3)}, N^{(4)}\}$, and output block $N^{(5)}$. Each block had three layers in the simplest case. The terms $a^{t(1)}, \ldots, a^{t(4)}$ represent the activations for the visible hidden layers and $a^{t(s)}$ is the output activation. The terms $a^{h(1)}, \ldots, a^{h(4)}$ represent the activations of the non-visible hidden layers. The deep-sweep method used two stages: pre-training and fine-tuning. The pre-training stage trained the blocks separately. It used supervised training for each block by using the block error $E^{(b)}$ between the output activation $a^{t(b)}$ and the target t. The fine-tuning stage began after the pre-training and also used supervised learning. It stacked all the blocks together and used an identity matrix I to connect contiguous blocks. Fine tuning optimized the weights with respect to the joint error $E_{ds}$.

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Embodiments, variations, and refinements of the blocking neural networks and the operations described in this specification can be implemented in digital electronic circuitry, or in computer software, firmware, or hardware, including the structures disclosed in this specification and their structural equivalents, or in combinations of one or more of them.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object (one or more modules of computer program instructions). Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

When a computing device is described as performing an action or method step, it is understood that the computing device is operable to perform the action or method step typically by executing one or more lines of source code. The actions or method steps can be encoded onto non-transitory memory (e.g., hard drives, optical drives, flash drives, and the like).

The term "computing device" generally refers to any device that can perform at least one function, including communicating with another computing device. In a refinement, a computing device includes a central processing unit that can execute program steps and memory for storing data and a program code.

The term "neural network" refers to a machine learning model that can be trained with training input to approximate unknown functions. In a refinement, neural networks include a model of interconnected digital neurons that communicate and learn to approximate complex functions and generate outputs based on a plurality of inputs provided to the model.

The term "quasi-linear term" refers to a function that can be approximated by a line to a predetermined accuracy (e.g., to within 5 percent deviation from the line).

Throughout this application, where publications are referenced, the disclosures of these publications in their entireties are hereby incorporated by reference into this application to more fully describe the state of the art to which this invention pertains.

Abbreviations:

"BP" means backpropagation.

With reference to FIG. 1, a neural network architecture implemented for classification or for neural network regression is schematically illustrated. Typically, the neural network architecture is implemented by one or more computing devices. For classification, input data x is classified into K classifications, where K is an integer providing the number of potential classifications, which can be any value greater than 1. Typically, input data x is digitally encoded data. Neural network architecture 10 includes an input block 12 and an output block 14. Input block 12 includes an input block input neuron layer 16, an input block hidden neuron layer 18, and an input block output neuron layer 20. Similarly, output block 14 includes an output block input neuron layer 22, an output block hidden neuron layer 24, and an output block output neuron layer 26. Neural network architecture 10 also includes at least one hidden block 30 interposed between the input block 12 and the output block 14. Although the present invention is not limited by the number of hidden blocks, typically, neural network architecture includes from 1 to 100 or more hidden blocks. At least one hidden block 30 includes a hidden block input neuron layer 32, a hidden block hidden neuron layer 34, and a hidden block output neuron layer 36. Although the present embodiment is not limited by the number of hidden neuron layers in each block, the input block, the output block, and each hidden block can each independently include from 1 to 100 or more hidden neuron layers. Characteristically, each neuron of the input block output neuron layer, the output block input neuron layer, output block output neuron layer, the hidden block input neuron layer, and the hidden block output neuron layer independently apply a logistic activation function or an activation function that is the sum of a logistic activation function and a linear term or an activation function that is the sum of a logistic activation function and a quasi-linear term. For example, the logistic sigmoid is given by the following:

$$a(x) = \frac{1}{1 + e^{-bx}}$$

where:

a is the activation function;

x is the input to the activation function; and b is a predetermined constant.

Therefore, an activation function that is the sum of a logistic activation function and a linear term is given by the following:

$$a(x) = cx + \frac{1}{1 + e^{-bx}}$$

where:

a is the activation function;

x is the input to the activation function; and b, c are predetermined constants.

It should be appreciated that the hidden layers in each of the blocks can also be a logistic activation function or an activation function that is the sum of a logistic activation function and a linear term or an activation function that is the sum of a logistic activation function and a quasi-linear term. In addition to these, hidden layers can have any other activation function known to those skilled in the art such as a ReLU activation function or a linear activation function or other nonlinear activations.

In a variation, neuron weights are tuned to maximize a global likelihood or posterior. In a refinement, neuron weights are tuned to maximize a global likelihood given by the following formula:

$$\Theta^* = \underset{\Theta}{\operatorname{argmax}} \log p(y, h_J, \ldots, h_1 \mid x, \Theta),$$

where $p(y, h_J, \ldots, h_1|x, \Theta)$ is the total likelihood of the neural network architecture;

$\Theta$ are model parameters;

x is the input data;

y is the output data;

hj is the output of the hidden blocks; and j is a label for the hidden blocks having a value from 1 to J where J is the total number of hidden blocks. In a refinement, the total likelihood is given by:

$$p(y, h_J, \ldots, h_1|x, \Theta) = p(y|h_J, \ldots, h_1, x, \Theta) \times p(h_1|x, \Theta) \times \prod_{j=2}^{J} p(h_j|h_{j-1}, \ldots, h_1, x, \Theta).$$

In another variation, the K classifications are encoded using codewords that are from a subset of $2^M$ codewords derived from a unit cube $[0, 1]^M$ wherein M is the dimension of the codewords. In a refinement, at least K codeword with at least a $\text{Log}_2$ K codelength are used for encoding. In a further refinement, the K classifications are encoded using a randomly selected subset of $2^M$ codewords derived from a unit cube $[0, 1]^M$ wherein M is the dimension of the codeword. It should be appreciated that the K classifications can be encoded using random bipolar coding. Typically, the codewords are orthogonal or approximately orthogonal. In a refinement, approximately orthogonal codewords are found by minimizing an inter-codeword similarity given by:

$$\mu_c = \frac{2}{K(K-1)} \sum_{k=1}^{K} \sum_{l>k}^{K} |c_k \cdot c_l|$$

where:

$\mu_c$ is the inter-codeword similarity;

K is the number of classifications;

c are codewords; and k, l are integer labels for the codewords. It should be appreciated that logistic output coding can use any of the $2^K$ binary vertices of the hypercube $[0, 1]^K$. This allows far fewer output logistic neurons to accurately code for the K pattern classes. The logistic layer's likelihood is that of a product of Bernoulli probabilities, and thus flips of K coin. Its log-likelihood has a double cross-entropy structure [1]. [2]. The softmax and logistic networks coincide when K=1.

In a variation, the probabilistic structure of the invention allows probabilistic noise perturbations to further improve the networks classification accuracy, training performance, pattern storage abilities. In this regard, the Noisy Expectation-Maximization (NEM) prescriptive condition set forth in US Pat. Pub. No. 20150161232, Noise-enhanced clustering and competitive learning; the entire disclosure of which is hereby incorporated by reference.

Figure 2A:
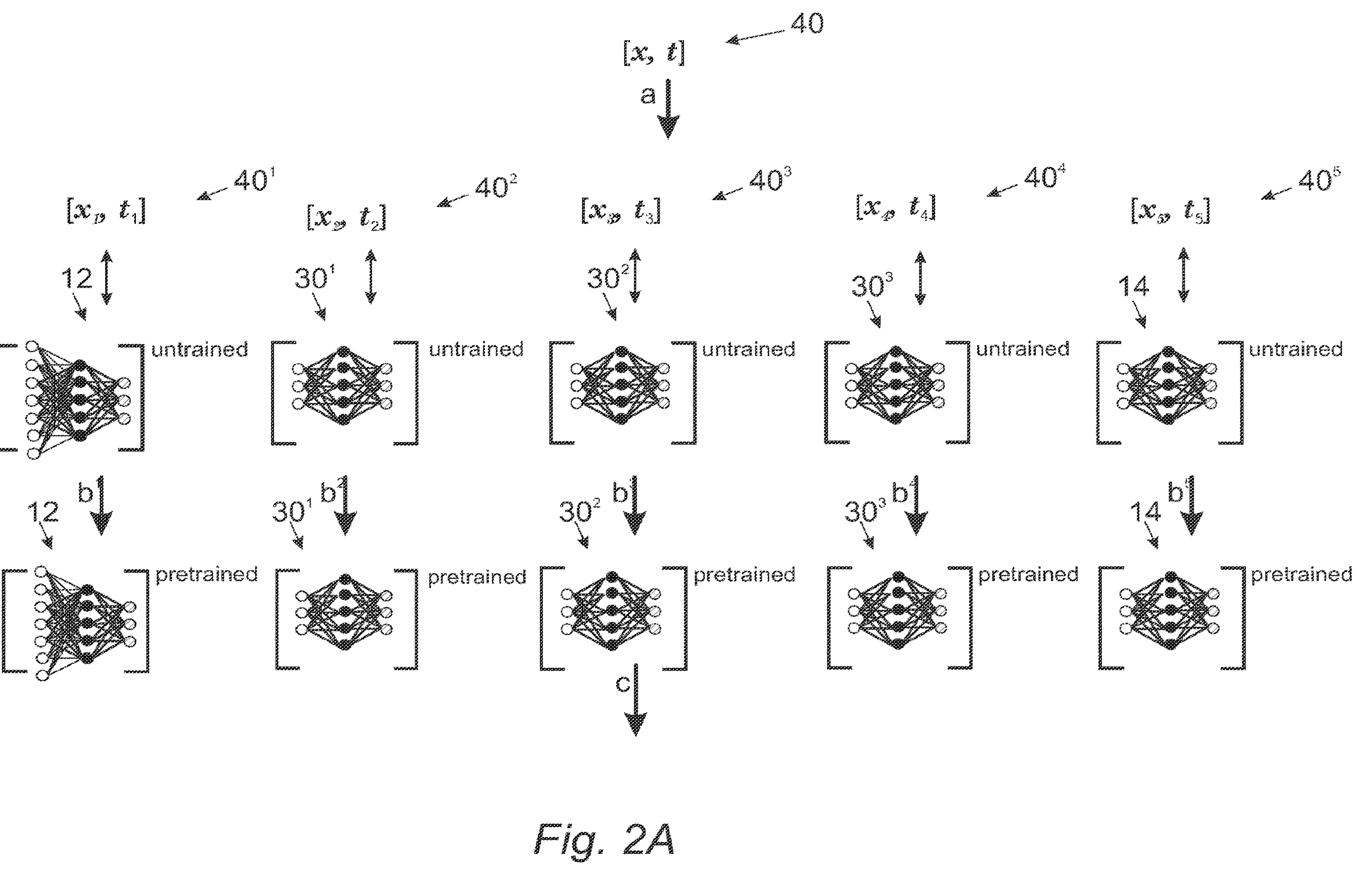
FIGS. 2A and 2B: Flowcharts showing the training of the neural network architecture of FIG. 1.
Figure 2B:
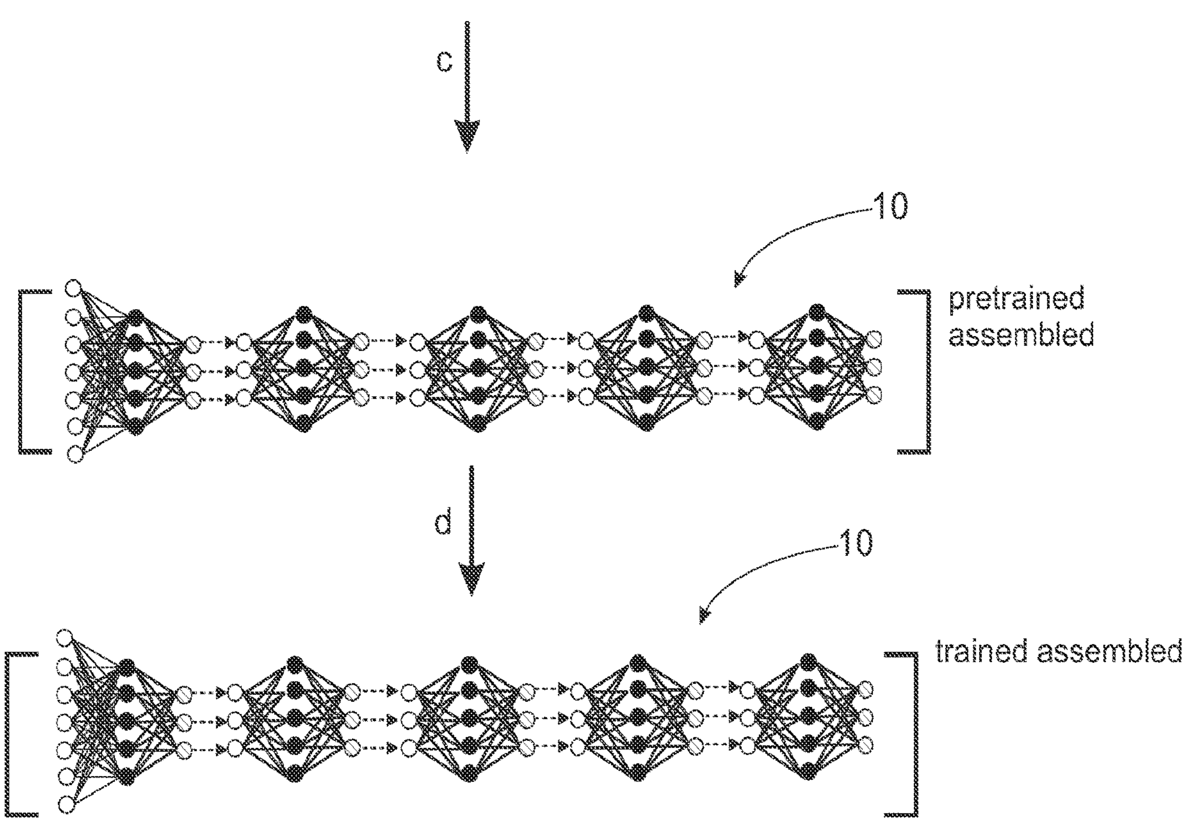

In another aspect, a computer-implemented method for training the neural network architecture of FIG. 1 for pattern classification or neural network regression is provided. Referring to FIGS. 2A and 2B, a predetermined training set 40 of digitally encoded inputs x and associated known targets t is collected. Each digitally encoded input has an associated known target t. In step a), a plurality of training sets for each of the blocks are formed from the training set [x, t]. In step $b^1$, the input block 12 is pretrained with a first training set 401 including $[x_1, t_1]$ or a training set derived therefrom to form a pretrained input block. Typically, $x_1$ is the initial encoded inputs x. In step $b^2$, the hidden block $\mathbf{30}^1$ is a pretrained output block with a second training set $\mathbf{40}^2$ having set $[x_2, t_2]$ to form a pretrained input block $\mathbf{30}^1$. In step $b^3$, optional hidden block $\mathbf{30}^2$ is a pretrained output block with a third training set $\mathbf{40}^3$ having set $[x_3, t_3]$ to form a pretrained input block $\mathbf{30}^2$. In step $b^4$, optional hidden block $\mathbf{30}^3$ is a pretrained output block with a fourth training set $\mathbf{40}^4$ having set $[x_4, t_4]$ to form a pretrained input block $\mathbf{30}^3$. Additional hidden blocks are analogously trained. In step $b^5$, the output block 14 is a pretrained output block with a first training set $\mathbf{40}^4$ having set $[x_4, t_4]$ to form a pretrained output block 14. In step c), assembling the pretrained input block, the pretrained output block, and the first pretrained hidden block are assembled into a pretrained assembled neural network architecture 10. In step c), the assembled pretrained neural network architecture is then trained with the first training set or a second training set to form a trained neural network architecture 10. Advantageously, these training protocol allows pretrained hidden blocks to be added or deleted.

In one implementation, the input block is pretrained with a first pre-training set of a plurality of digitally encoded inputs and the first plurality of codewords (e.g., randomly selected codewords) as input block targets. Each randomly selected codeword of the first pre-training set is associated with one digitally encoded input. Similarly, the first hidden block is pretrained with second pre-training set of the first plurality of randomly selected codewords as inputs to the first hidden block and the second plurality of randomly selected codewords as the first hidden block targets with each randomly selected codeword of the second training set being associated with one digitally encoded input. Since the neural network architecture can include one or more additional hidden blocks interposed between the first hidden block and the output block, these hidden blocks are pretrained analogously. Finally, the output block is pretrained with a final pre-training set of a final plurality of randomly selected codewords from a last hidden block as inputs to the output block and the known associated targets as output block targets. In a variation, the assembled pretrained neural network architecture is trained by deep-sweep training.

Figure 3A:
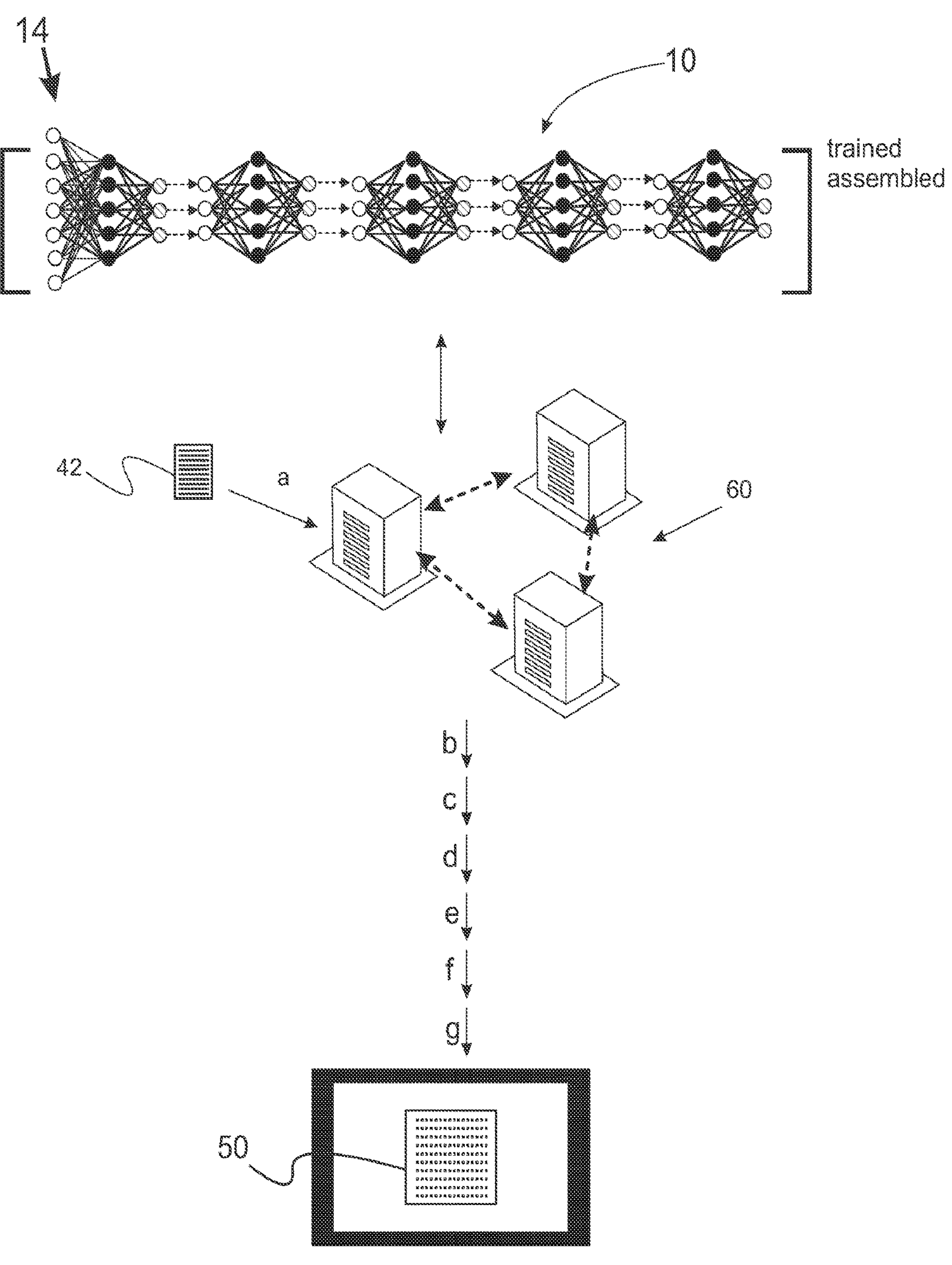
FIGS. 3A and 3B. Flowcharts showing a computer implement method for determining classifications using the neural network architecture of FIG. 1.
Figure 3B:
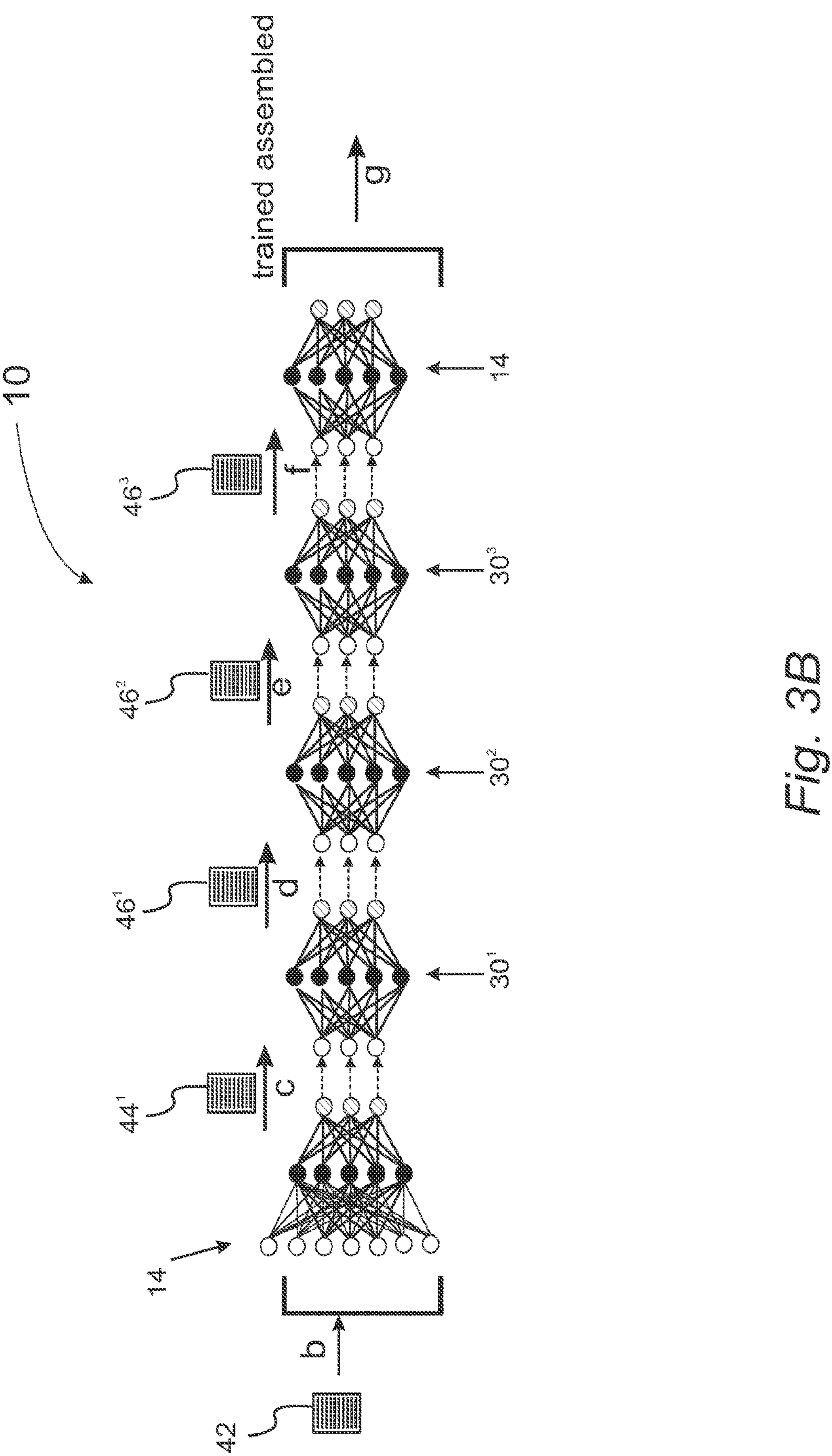

In another aspect, a computer-implemented method for generating target classifications for an object from a set of input sequences is provided. As depicted in FIGS. 3A and 3B, one or more computing devices 60 have encoded in memory therein the trained neural network architecture 10. The computer-implemented method includes a step in which computing device 60 receives digitally encoded input data 42. The digitally encoded input data 42 is provided to an input block 14 of neural network architecture 10 as set forth above. Input block 14 includes an input block input neuron layer, an input block hidden neuron layer, and an input block output neuron layer. Input block output data 44 is provided hidden block $\mathbf{30}^1$. If additional hidden blocks are present, hidden block output data 441 is provided to hidden block $\mathbf{30}^{i+1}$ where i is an integer label running from 1 to the number of hidden blocks. Hidden block output from the last hidden block is provided to the output block 14. As set forth above, each neuron of the input block output neuron layer, the output block input neuron layer, output block output neuron layer, the hidden block input neuron layer and the hidden block output neuron layer, independently applies a logistic activation function or an activation function that is the sum of a logistic activation function and a linear term or an activation function that is the sum of a logistic activation function and a quasi-linear term. In step g), one or more classifications 50 are provided to a user as output from the output block. In a refinement, classifications are encoded using a randomly selected set of codewords as set forth above.

In one variation, the digitally encoded input data includes an image, and the one or more classifications include a description or keyword assigned to the image. In this case, the training set would include a set of images with known description and/or key words.

In another variation, the digitally encoded input data includes a user's medical information, and the one or more classifications include a diagnosis and/or a most likely disease. The user's medical information can include patient data selected from the group consisting of physiological measurements, environmental data, genetic data, and combinations thereof. In this case, the training set would include a set of medical information with known diagnosis.

In another variation, the digitally encoded input data includes genetic information from an organism, and the one or more classifications include identification of the organism or a list of related organisms. In this case, the training set would include a set of genomes from known organisms.

Figure 4:
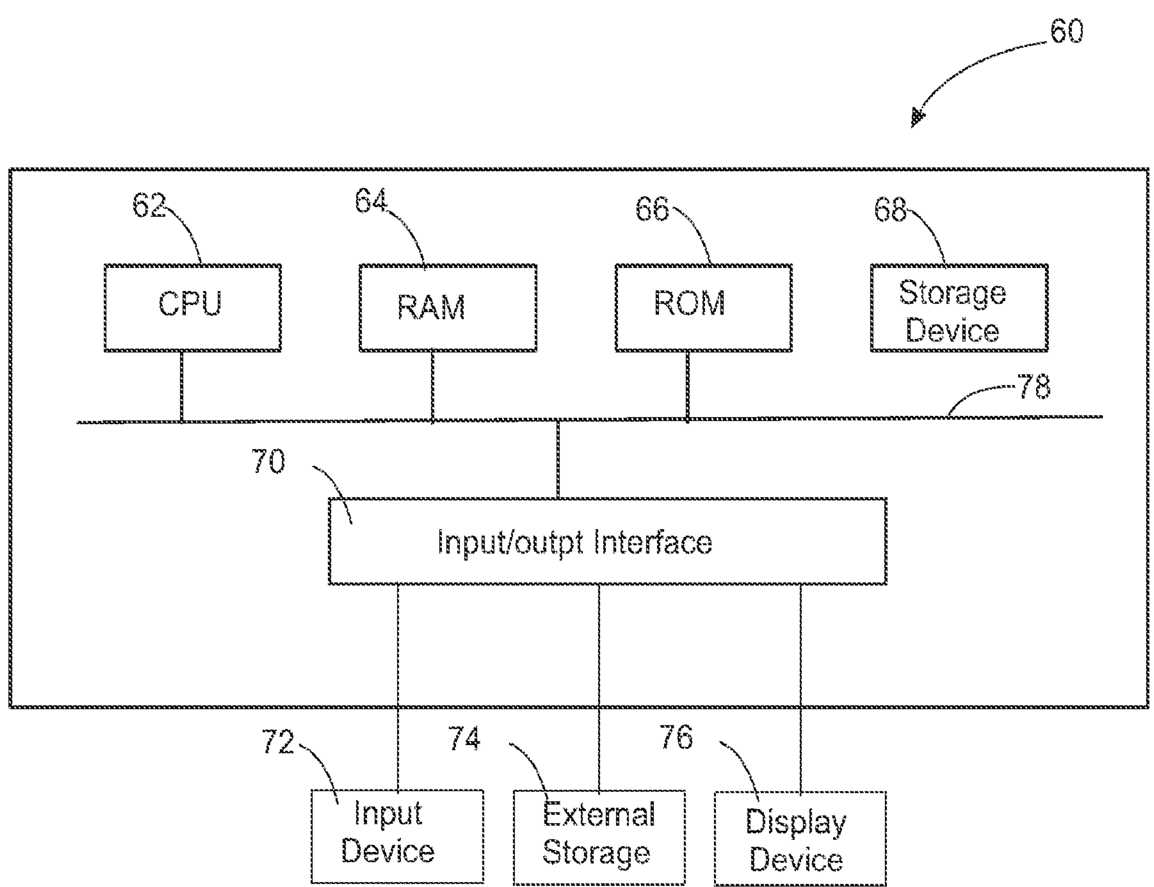
FIG. 4: Schematic of a computing device for performing the methods using the neural network architecture of FIG. 1.

The neural network architecture and related methods set forth herein can be implemented by specialized hardware design for that purpose. More commonly, these steps can be implemented by a computer program executing on a computing device. FIG. 4 provides a block diagram of a computing system that can be used to implement the methods. Each computing device of computing device 60 includes a processing unit 62 that executes the computer-readable instructions set forth herein. Processing unit 62 can include one or more central processing units (CPU) or microprocessing units (MPU). Computing device 60 also includes RAM 64 or ROM 66 having encoded therein: an input block including an input block input neuron layer, an input block hidden neuron layer, and an input block output neuron layer; an output block including an output block input neuron layer, an output block hidden neuron layer, and an output block output neuron layer; and at least one hidden block interposed between the input block and the output block, the at least one hidden block including a hidden block input neuron layer, a hidden block hidden neuron layer, and a hidden block output neuron layer, wherein each neuron of the input block output neuron layer, the output block input neuron layer, output block output neuron layer, the hidden block input neuron layer and the hidden block output neuron layer independently applies a logistic activation function. Computing device 60 can also include a secondary storage device 68, such as a hard drive. Input/output interface 70 allows interaction of computing device 60 with an input device 72 such as a keyboard and mouse, external storage 74 (e.g., DVDs and CDROMs), and a display device 76 (e.g., a monitor). Processing unit 62, the RAM 64, the ROM 66, the secondary storage device 68, and input/output interface 70 are in electrical communication with (e.g., connected to) bus 78. During operation, Computing device 60 reads computer-executable instructions (e.g., one or more programs) recorded on a non-transitory computer-readable storage medium which can be secondary storage device 68 and or external storage 74. Processing unit 62 executes these reads computer-executable instructions for the computer-implemented methods set forth herein. Specific examples of non-transitory computer-readable storage medium for which executable instructions for computer-implemented methods are encoded onto include but are not limited to, a hard disk, RAM, ROM, an optical disk (e.g., compact disc, DVD), or Blu-ray Disc (BD)™), a flash memory device, a memory card, and the like.

Figure 5:
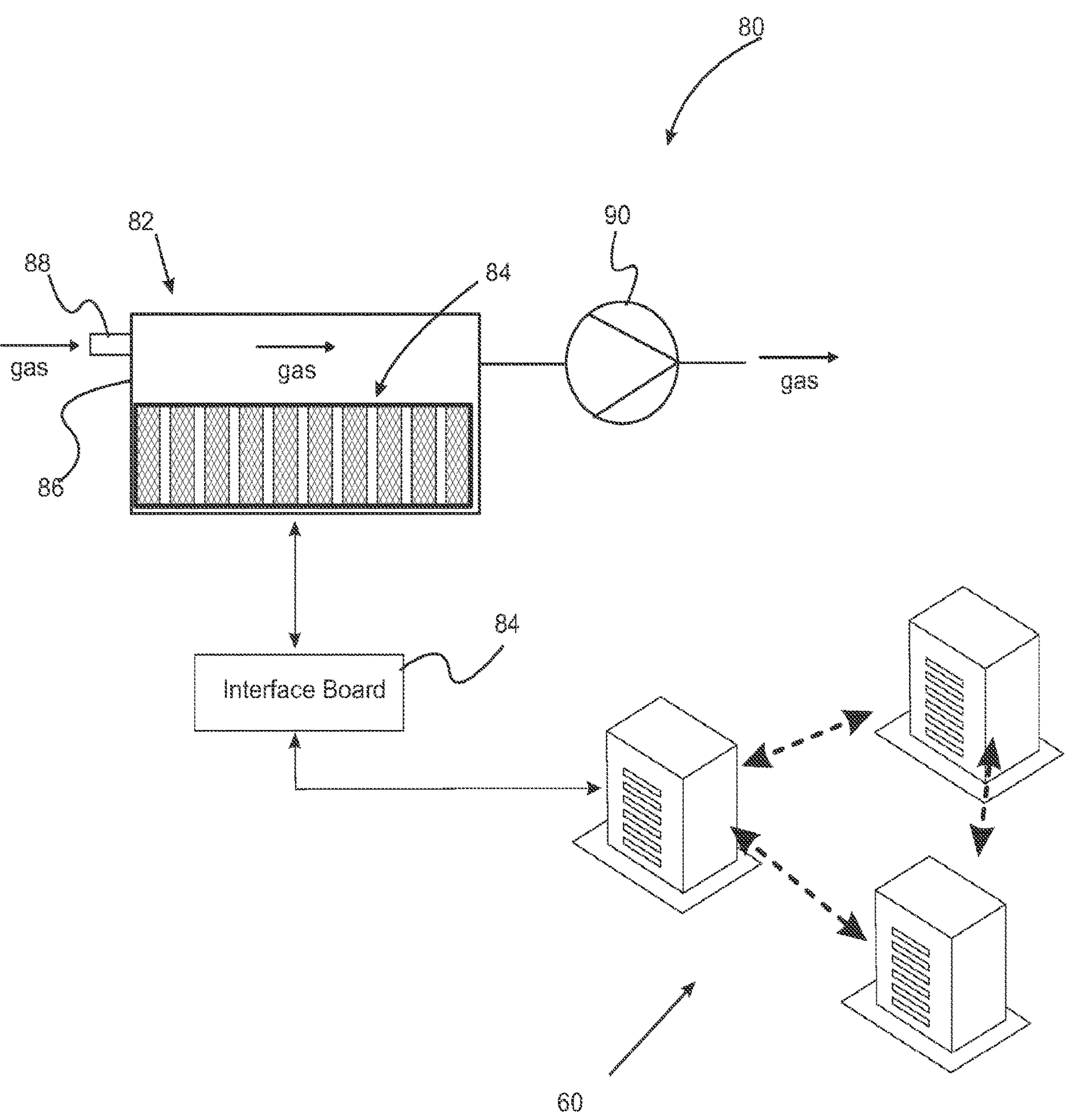
FIG. 5. Schematic of an artificial olfactory system for using the neural network architecture of FIG. 1.

Referring to FIG. 5, a system for classifying input data into classifications or for neural network regression encoded is schematically described. Classification system 80 includes at least one sensor 82 and an interface 84 in electrical communication with the at least one sensor. Computing device 60 is configured to receive data from the at least one sensor through interface 84. Characteristically, computing device 60 applies a trained neural network architecture for classifying input data classifications or for neural network regression encoded in memory thereof. Details for the trained neural network architecture are set forth above. In this variation, computing device 60 is configured to receive digitally encoded input data from the at least one sensor; provide the digitally encoded input data to the input block; provide input block output data to the at least one hidden block; provide hidden block output from the at least one hidden bock to the output block; and provide one or more classifications to a user as output from the output block.

Still referring to FIG. 5, the at least one sensor 82 is an array of sensors 84 in electrical communication with the computing device 60. Each sensor in the array of sensors transfers its associated sensor data to the computing device 60. Associated sensor data from the array of sensors form a set of associated data from the array of sensors to be classified. In a refinement, the array of sensors 84 include a plurality of gas sensors. Examples of gas sensors include metal oxides sensors (e.g. tin oxide detectors), conducting polymers (e.g. polypyrrole films) and piezoelectric sensors. In another refinement, the at least one sensor is a mass spectrometer. In another refinement, the trained neural network architecture is formed by training a corresponding untrained neural network architecture with a training set that includes a plurality of gaseous compositions of known composition. Advantageously, when system 80 includes a plurality of gas sensors, the system can operate as an artificial olfactory system. In such an application, the array of sensors 84 can include a sampling chamber 86 that houses the array of sensors. Gas is drawn in through inlet port 88, flowing in a space over the array of sensors. Pump 90 draws gases from the environment into sampling chamber 86.

In another refinement, the trained neural network architecture is formed by training a corresponding untrained neural network architecture with a training set that includes a plurality of gaseous compositions of known composition. Advantageously, when system 80 includes a plurality of gas sensors, the system can operate as an artificial olfactory system. In such an application, the array of sensors 84 can include a sampling chamber 86 that houses the array of sensors. Gas is drawn in through inlet port 88 flowing in a space over the array of sensors. Pump 90 draws gases from the environment into sampling chamber 86.

Figure 6:
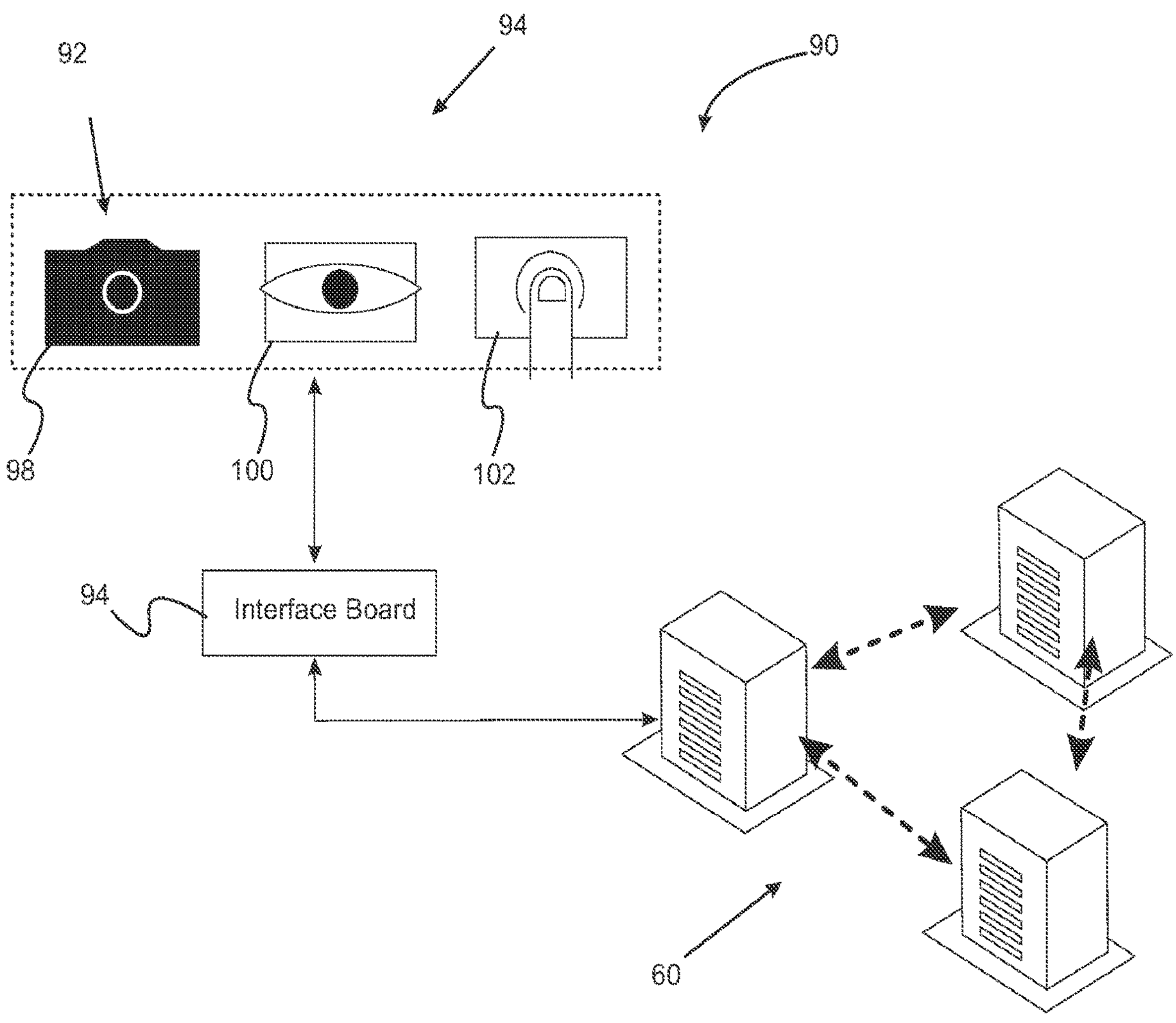
FIG. 6. Schematic of a biometric system for using the neural network architecture of FIG. 1.

Referring to FIG. 6, a schematic of a biometric classification system applying the neural network architecture set forth herein is provided. Biometric system 90 includes at least one sensor 92 and an interface 94 in electrical communication with the at least one sensor. Computing device 60 is configured to receive data from the at least one sensor through interface 94. Characteristically, computing device 60 applies a trained neural network architecture for classifying input data classifications or for neural network regression encoded in memory thereof. Details for the trained neural network architecture are set forth above. In this variation, computing device 60 is configured to receive digitally encoded input data from the at least one sensor; provide the digitally encoded input data to the input block; provide input block output data to the at least one hidden block; provide hidden block output from the at least one hidden bock to the output block; and provide one or more classifications to a user as output from the output block.

Still referring to FIG. 6, the at least one sensor 92 is an array of sensors 84 in electrical communication with the computing device 60. Each sensor in the array of sensors transfers its associated sensor data to the computing device 60. Associated sensor data from the array of sensors forms a set of associated data from the array of sensors to be classified. In a refinement, array of sensors 84 include a plurality of biometric sensors. Examples of biometric sensors include, but are not limited to, camera 98, iris scanner 100, fingerprint analyzer 102, and the like.

Figure 7:
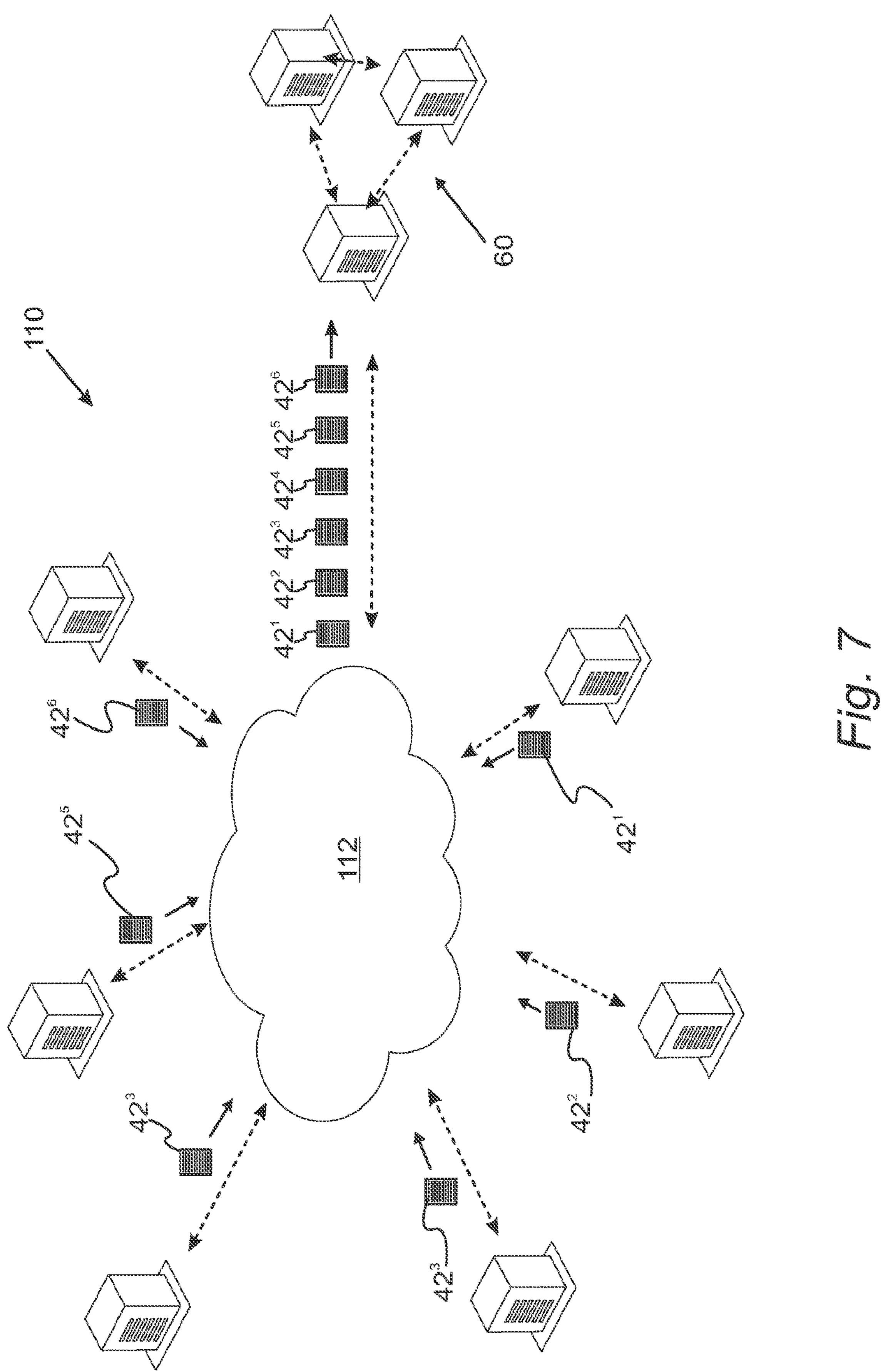
FIG. 7. Schematic of a cloud-based system using Schematic of an artificial olfactory system for using the neural network architecture of FIG. 1.

Referring to FIG. 7, a system for classifying input data obtained from users over a network into classifications or for neural network regression. Classification system 110 includes a computing device 60 configured to receive digitally encoded input data from a plurality of users over the Internet 112 (or any network). Computing device 60 applies a trained neural network architecture for classifying input data classifications or for neural network regression encoded in memory thereof. As set forth above, the neural network architecture includes an input block including an input block input neuron layer, an input block hidden neuron layer, and an input block output neuron layer; an output block including an output block input neuron layer, an output block hidden neuron layer, and an output block output neuron layer; and at least one hidden block interposed between the input block and the output block, the at least one hidden block including a hidden block input neuron layer, a hidden block hidden neuron layer, and a hidden block output neuron layer. Characteristically, each neuron of the input block output neuron layer, the output block input neuron layer, output block output neuron layer, the hidden block input neuron layer and the hidden block output neuron layer, independently applies a logistic activation function or an activation function that is the sum of an activation function and a linear term or an activation function that is the sum of an activation function and a quasi linear term. Computing device 60 is configured to: receive digitally encoded input data; provide the digitally encoded input data to the input block; provide input block output data to the at least one hidden block; provide hidden block output from the at least one hidden bock to the output block; and provide one or more classifications to a user as output from the output block.

In a variation, the digitally encoded input data includes a user's browsing history over the Internet and the one or more classifications are suggested items for purchase or websites to visit. In a variation, the digitally encoded input data includes physiological and behavioral characteristics of a targeted subject, and the one or more classifications include identification of the targeted subject. In a further refinement, digitally encoded input data includes a feature selected from the group consisting of fingerprint, height, typing style on a keyboard, body movement, color, size of a subject's iris, and combinations thereof.

Figure 8:
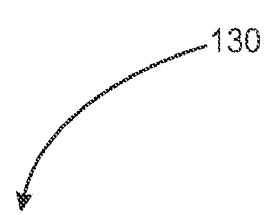
FIG. 8. Provides a schematic of a digital classifier.

Referring to FIG. 8, a schematic showing that the trained neural network architecture can be implemented in the form of integrated circuit components or layers which can be realized partially or completely in software running on computing device 60 or partially or completely by electronic components. In a refinement, the blocking neural networks can be implemented as a combination of circuit-simulating components software running on computing device 60. Trained neural network architecture circuit (or untrained neural network architecture circuit) 130 includes input block integrated circuit component 132 including an input block input neuron layer circuit 134, an input block hidden neuron layer circuit 136, and an input block output neuron layer circuit 138.

Output block circuit 140 includes an output block input neuron layer circuit 142, an output block hidden neuron layer 144, and an output block output neuron layer circuit 146. At least one hidden block circuit 150 is in electrical communication with input block integrated circuit component 132 and Output block circuit 140. At least one hidden block 150 includes a hidden block input neuron layer circuit 152, a hidden block hidden neuron layer circuit 154, and a hidden block output neuron layer circuit 156. As set forth above, each neuron of the input block output neuron layer circuit, the output block input neuron layer circuit, output block output neuron layer circuit, the hidden block input neuron layer circuit, and the hidden block output neuron layer circuit independently applies a logistic activation function or an activation function that is the sum of an activation function and a linear term or an activation function that is the sum of an activation function and a quasi-linear term. Each of the circuits included in the trained neural network architecture circuit (or untrained neural network architecture circuit) 130 can be realized by logic arrays and, in particular, programmable logic arrays. In some variations, one or more or all of the circuits included in the trained neural network architecture circuit (or untrained neural network architecture circuit) 130 can be realized by circuit simulating software.

Additional details of the blocking neural network architecture are found in O. Adigun and B. Kosko, "High Capacity Neural Block Classifiers with Logistic Neurons and Random Coding," 2020 International Joint Conference on Neural Networks (IJCNN), 2020, pp. 1-9, doi: 10.1109/IJCNN48605.2020.9207218; the entire disclosure of which is hereby incorporated by reference.

The following examples illustrate the various embodiments of the present invention. Those skilled in the art will recognize many variations that are within the spirit of the present invention and scope of the claims.

As set forth above, FIG. 1 shows the block structure of a deep logistic network. FIG. 7 shows sample random coding vectors of lengths M=20, 60, and 100 for logistic networks that encode K=100 pattern classes. The remaining figures show how block logistic networks with random coding can encode the CIFAR-100 and Caltech-256 patterns with fewer than K=100 or K=256 respective output neurons. Logistic networks also had higher classification accuracy than did softmax networks with the same number of neurons. The last figure shows that the very best performance came from deep-sweep training of all the blocks after pre-training the individual blocks. Table 3 shows that 80 logistic output neurons did better on the Caltech-256 data than did 256 softmax output neurons.

Earlier work [3], [4] explored how random basis vectors affected the approximation error of neural function approximators. Our random coding method deals with increasing the capacity of encoding patterns at the output or visible hidden layers. Other work [5] explored the formal capacity of some feedforward networks. Our work shows how to improve the pattern capacity of deep neural classifiers with logistic output neurons, block structure, and deep-sweep training.

I. Finding Random Codewords for Patterns

A. Network Likelihood Structure and BP Invariance

Training a neural network optimizes the network parameters with respect to an appropriate loss function. This also maximizes the log-likelihood $L(y/x, \Theta)$ of the network [6]-[8]. Backpropagation invariance holds at each layer if the parameter gradient of the layer likelihood gives back the same backpropagation learning laws [1], [2].

The network's complete likelihood describes the joint probability of all layers [1]. Suppose a network has J hidden layers $h_1, h_2, \ldots, h_J$. The term $h_j$ denotes the $j^{th}$ hidden layer after the input (identity) layer. The complete likelihood is the probability density $p(y, h_J, \ldots h_1|x, \Theta)$.

The chain rule or multiplication theorem of probability factors the likelihood into a product of the layer likelihoods:

$$p(y, h_J, \ldots, h_1 \mid x, \Theta) = p(y \mid h_J, \ldots, h_1, x, \Theta) \times p(h_1 \mid x, \Theta) \times \prod_{j=2}^{J} p(h_j \mid h_{j-1}, \ldots, h_1, x, \Theta) \tag{1}$$

where we assume that p(x)=1 for simplicity [1], [9], [10]. So the complete log-likelihood $$L(y, h|\Theta) \text{ is } L(y, h|\Theta) = \log p(y, h_J, \ldots, h_1|x, \Theta) = L(y|x, \Theta) + \sum_{j=1}^{J} L(h_j|x, \Theta)$$

where $L(y|x, \Theta)=\log p(h_j|h_{j-1}, \ldots, h_1, x, \Theta)$. The output layer has log-likelihood $L(y|x, \Theta)=\log p(y|h_j, \ldots, h_1, x, \Theta)$. The next sections use this structure in the equivalent form of layer error functions.

B. Output Activation, Decision Rule, and Error Function

Input x passes through a classifier network $\mathcal{N}$ and gives $o^t=\mathcal{N}(a^x)$ where $o^t$ is the input to the output layer. The output activation $a^t$ equals $f(o^t)$ where $f$ is a monotonic and differentiable function. Softmax or Gibbs activation functions [6], [11] remain the most used output activation for neural classifiers. Aspects set forth herein explore instead binary and bipolar output logistic activations. Logistic output activations give a choice of $2^M$ codewords at the vertices of the unit cube $[0, 1]^M$ to code for the K patterns as opposed to the softmax choice of just the M vertices of the embedded probability simplex.

Codeword $c_k$ is an M-dimensional vector that represents the $k^{th}$ class. M is the codeword length. Each target t is one of the K unique codewords $\{c_1, c_2, \ldots, c_1, c_2, \ldots, c_K\}$. The decision rule for classifying x maps the output activation at to the class with the closest codeword:

$$C(x) = \underset{k}{\operatorname{argmin}} \sum_{l=1}^{K} |c_{kl} - a_l^t| \tag{2}$$

where C(x) is the predicted class for input x, $$a_l^t$$

is the $l^{th}$ argument of the output activation, and $c_{kl}$ is the $l^{th}$ component of the $k^{th}$ codeword $c_k$. The next section describes the output activations and their layer-likelihood structure.

1) Softmax or Gibbs Activation: This activation maps the neuron's input $o^t$ to a probability distribution over the predicted output classes [2], [11]. The activation $$a_l^t$$

of the $l^{th}$ output neuron has the multi-class Bayesian form:

$$a_l^t = \frac{\exp(o_l^t)}{\sum_{k=1}^{K} \exp(o_k^t)} \tag{3}$$

where of is the input of the $l^{th}$ output neuron. A single such logistic function defines the Bayesian posterior in terms of the log-posterior odds for simple two-class classification [6].

The softmax activation (3) uses K binary basis vectors from the Boolean $\{0, 1\}^K$ as the codewords. The codeword length M equals the number K of classes in this case: M=K. The decision rule follows from (2). The error function $E_8$ for the softmax layer is the cross entropy [1] since it equals the negative of the log-likelihood for a layer multinomial likelihood—a single roll of the network's implied K-sided die:

$$E_s = -\sum_{k=1}^{K} t_k \log(a_k^t) = -\log \prod_{k=1}^{K} a_k^{t_k} \tag{4}$$

where $t_k$ is the $k^{th}$ argument of the target. The softmax decision rule follows from (2). The rule simplifies for the unit bit basis vectors as the codewords. Let $$\sum_{l=1}^{K}|c_{kl}-a_l^t|$$

where $D^{(k)}$ is the distance between $a^t$ and $c_k$. Then $$C(x)=\underset{k}{\operatorname{argmin}}\ D^{(k)}=\underset{k}{\operatorname{argmax}} a_k^t \tag{5}$$

because M=K. So C(x)=m implies that $D^{(m)} \le D^{(k)}$ for k E {1, 2, . . . , K}. The decision rule simplifies as in (5) because $c_{kk}=1$, $c_{kl}=0$ for all l≠k, and $$0 \le a_l^t \le 1$$

for L∈{1,2, . . . , K}.

2) Binary Logistic Activation: The binary activation $$a_l^t$$

maps the input $o^t$ to a vector in the unit hypercube $[0, 1]^M$:

$$a_l^t=\frac{1}{1+\exp(-o_l^t)} \tag{6}$$

activation of the lth output neuron where of is the input of the $$o_l^t$$

output neuron. The codewords are vectors from $\{0, 1\}^M$ where $\log_2 K \le M$. The decision rule for the bipolar logistic activation follows from (2). We can also impose the equidistant condition on the codewords by picking the basis vectors from the Boolean $\{0, 1\}^M$ as the codewords with M=K. The decision rule simplifies to equation (5) in this case. Binary logistic activation uses the double cross entropy $E_{log}$ as its error function. This is equivalent to the negative of the log-likelihood with independent Bernoulli probability distribution.

$$E_{log}=-\sum_{l=1}^{M}[t_l\log(a_l^t)+(1-t_l)\log(1-a_l^t)] \tag{7}$$

$$=-\log\prod_{l=1}^{M} a_k^{t(t_k)}1-a_k^{t(1-t_k)} \tag{8}$$

The term $$a_l^t$$

denotes the activation of the $l^{th}$ output neuron and $t_l$ is the $l^{th}$ argument of the target vector.

3) Bipolar Logistic Activations: A bipolar logistic activation maps $o^t$ to a vector in $[-1, 1]^M$. The activation $$a_l^t$$

of the $z^{th}$ output neuron has the forms $$a_l^t=\frac{2}{1+\exp(-o_l^t)}-1=\frac{1-\exp(-o_l^t)}{1+\exp(-o_l^t)} \tag{9}$$

where $$o_l^t$$

is the input into the $l^{th}$ output neuron. The codewords are K bipolar vectors from $\{-1, 1\}^M$ such that $\log_2 K \le M$.

The decision in this case follows from (2). The corresponding error function $E_{b\_log}$ is the double cross entropy. This requires a linear transformation of $$a_l^t$$

and $t_k$ as follows:

$$\tilde{a}_l^t=\frac{1}{2}(1+a_l^t) \text{ and } \tilde{t}_k=\frac{1}{2}(1+t_k).$$

The bipolar logistic activation uses the transformed double cross-entropy. This is equivalent to the negative of the log-likelihood of the transformed terms with independent Bernoulli probabilities:

$$E_t=-\sum_{l=1}^{M}\left[\tilde{t}_k\log(\tilde{a}_k^t)+\left(1-\tilde{t}_k\right)\log(1-\tilde{a}_k^t)\right] \tag{10}$$

$$=-\frac{1}{2}\sum_{k=1}^{M}[(1+t_k)\log(1+a_k^t)+(1-t_k)\log(1-a_k^t)-2\log 2)] \tag{11}$$

$$=-\log\prod_{l=1}^{M}(\tilde{a}_k^t)^{(\tilde{t}_k)}(1-\tilde{a}_k^t)^{(1-\tilde{t}_k)}. \tag{12}$$

Training seeks the best parameter Θ* that minimizes the error function. So we can drop the constant terms in $E_t$. The modified error $E_{b\_log}$ has the form $$E_{b\_log}=-\sum_{l=1}^{M}(1+t_l)\log(1+a_l^t)+(1-t_l)\log(1-a_l^t). \tag{13}$$

The backpropagation (BP) learning laws remain invariant at a softmax or logistic layer if the error functions have the appropriate respective cross-entropy or double-cross-entropy form. The learning laws are invariant for softmax and binary logistic activations because [7], [8]:

$$\frac{\partial E_s}{\partial u_{lj}} = \frac{\partial E_{log}}{\partial u_{lj}} = (a_l^t - t_l)a_j^h \tag{14}$$

$h$ where $\mu_{lj}$ is the weight connecting the $j^{th}$ neuron of the hidden layer to the $l^{th}$ output neuron, $$a_j^h$$

is the activation of the $j^{th}$ neuron of the hidden layer linked to the output layer, and $$o_l^t = \sum_{j=1}^J u_{lj} a_j^h.$$

The derivative in the case of using a bipolar logistic output activation is $$\frac{\partial E_{blog}}{\partial u_{lj}} = \frac{\partial E_{b\_log}}{\partial a_l^t}\frac{\partial a_l^t}{\partial o_l^t}\frac{\partial o_l^t}{\partial u_{lj}} \tag{15}$$

$$= \frac{2(a_l^t - t_k)}{(1 - a_l^t)(1 + a_l^t)}\frac{(1 + a_l^t)(1 - a_l^t)}{2}a_j^h \tag{16}$$

$$= (a_l^t - t_l)a_j^h. \tag{17}$$

$s$

So the BP learning laws remain invariant for the softmax, binary logistic, and bipolar logistic activations because (14) equals (17).

C. Random Coding with Bipolar Codewords

We now present the method for picking K random bipolar codewords from $\{-1, 1\}^M$ with $\log_2 K \le M < K$. The bipolar Boolean cube contains $2^M$ codewords since the bipolar unit cube $[-1, 1]^M$ has M vertices. It is computationally expensive to pick M=K for a dataset with big values of K such as 10,000 or more [12], [13]. Our goal is to find an efficient way to pick K codewords with log? K≤M<K. It should also be appreciated that the random coding method is applicable to binary codes.

Let code C be a K×M matrix such that the kth row $c_k$ is the $k^{th}$ codeword and $d_{kl}$ be the similarity measure between $c_k$ and $c_l$. We have $d_{kl}=|c_k \cdot c_l|$, There are $$\frac{1}{2}(K(K-1)$$

unique pairs of codewords. The mean $\mu_c$ of the inter-codeword similarity measure has the normalized correlation form $$\mu_c = \frac{2}{K(K-1)}\sum_{k=1}^{K}\sum_{l>k}^{K}|c_k \cdot c_l|. \tag{18}$$

This random coding method uses $\mu_c$ to guide the search. The method finds the best code C* with the minimum similarity mean $$\mu_c^*$$

for a fixed M. Algorithm 1 shows the pseudocode for this method. A high value of $\mu_c$ implies that most of the codewords are not orthogonal while a low value of $\mu_c$ implies that most of the codewords are orthogonal. FIG. 9 shows examples of codewords from Algorithm 1. As set forth above, it should also be appreciated that the random coding method is applicable to binary codes.

In a refinement, a deterministic scheme can be applied to pick codewords with code length M less than the number of classes.

D. Deep-Sweep Training of Blocks

Deep-sweep training optimizes a network with respect to the network's complete likelihood in (1). This method performs blocking on deep networks by breaking the network down into small multiple contiguous networks or blocks. FIG. 1 shows the architecture of a deep neural network with the deep-sweep training method. The figure shows the small blocks that make up the deep neural network. $N^{(1)}$ is the input block, $N^{(B)}$ is the output block, and the others are hidden blocks. The layer of connection between two blocks is treated as a visible hidden layer. We need the number of blocks B≥2 to use the deep-sweep method. Let the term $L^{(b)}$ denote the number of layers for block $N^{(b)}$. $L^{(b)}$ must be greater than 1 because each block has at least an input layer and an output layer. $\Theta_b$ represents the weights of $N^{(b)}$.

The training method applied herein trains a neural network in two stages. The first stage is the pre-training and the second stage is fine-tuning (e.g., a deep-sweep stage). The pre-training stage trains the blocks separately as supervised learning tasks. $N^{(1)}$ maps x into the corresponding range of the output activation. The output activation $a^{t(b)}$ of the $b^{th}$ block is:

$$o^{t(b)} = \begin{cases} N^{(b)}(t), & \text{if } b \in \{2, \ldots, B\} \\ N^{(b)}(x), & \text{otherwise} \end{cases} \tag{19}$$

and $a^{t(b)}=f(o^{t(b)})$ where t is the target, $o^{t(b)}$ is the input to the output layer of $N^{(b)}$, and $a^{t(b)}$ is the output activation of $N^{(b)}$. The error function $E^{(b)}$ measures the error between the target t and activation $a^{t(b)}$. The error function $E^{(b)}$ of $N^{(b)}$ for $b \in \{1, 2, 3, \ldots B\}$ with a bipolar logistic activation is:

$$E^{(b)} = -\sum_{l=1}^{M}(1+t_l)\log\left(1+a_l^{t(b)}\right)+(1-t_l)\log\left(1-a_l^{t(b)}\right) \tag{20}$$

s where $$a_l^{t(b)}$$

is the $l^{th}$ component of the output activation of $N^{(b)}$. The fine-tuning stage follows the pre-training stage. It involves stacking the blocks and a deep-sweep across the entire network $\mathcal{N}$ from the input layer to the output layer. FIG. 1 shows the stacked blocks where x is the input through $N^{(1)}$ and the output activation $$\tilde{a}_l^{t(B)}$$

comes from the output of $\mathcal{N}$. We have:

$$\tilde{o}^{t(b)} = \begin{cases} N^{(b)}(\tilde{a}^{t(b-1)}), & \text{if } b \in \{2, \ldots, B\} \\ N^{(b)}(x), & \text{otherwise} \end{cases} \tag{21}$$

and $\tilde{a}^{t(b)} = f(\tilde{o}^{t(b)})$. The deep-sweep error $$E_{ds}^{(b)}$$

for the fine-tuning stage is different from the error $$E^{(b)}.\ E_{ds}^{(b)}$$

is the deep-sweep error between $\tilde{a}^{t(b)}$ and the target t. So the corresponding deep-sweep error for a network with bipolar logistic activation is:

$$E_{ds}^{(b)} = -\sum_{l=1}^{M}\left[(1+t_l)\log\left(1+\tilde{a}_l^{t(b)}\right)+(1-t_l)\log\left(1-\tilde{a}_l^{t(b)}\right)\right] \tag{22}$$

for $b \in \{1, 2, \ldots, B\}$ where $\tilde{a}^{t(b)}$ is the $l^{th}$ component of the activation $\tilde{a}^{t(b)}$. The update rule at this stage differs from ordinary BP. Ordinary BP trains network parameters with a single error function at the output layer since the algorithm does not directly know the correct output value of a hidden layer. But we do know the correct output layer of an interior block since it just equals the random codeword. So the deep-sweep method updates the weights with respect to errors at the output layer of the blocks. The joint deep-sweep error $E_{ds}$ is:

$$E_{ds} = -\sum_{b=1}^{B}\sum_{l=1}^{M}\left[(1+t_l)\log\left(1+\tilde{a}_l^{t(b)}\right)+(1-t_l)\log\left(1-\tilde{a}_l^{t(b)}\right)\right] \tag{23}$$

$$= \sum_{b=1}^{B} E_{ds}^{(b)} \tag{24}$$

and the update rule for any parameter $\Theta_b$ follows from the derivative of this joint error. Algorithm 2 shows the pseudocode for this method.

II. Simulation Experiments

Our coding simulations compared the performance of the output activations. Output logistic activations outperformed softmax activation. We also simulated the performance of the random coding method in algorithm 1. The classification accuracy of neural classifiers decreased as $\mu_c$ increased with a fixed M and $\log_2 \le M < K$. The result also shows that the accuracy with bipolar codewords and M=0.4K is comparable with the accuracy from using the softmax activation with K dimensional codewords (basis vectors).

We found that training a deep neural classifier with the deep-sweep method outperformed training with ordinary backpropagation. The next section describes the datasets for the experiments.

A. Datasets

These classification experiments used the CIFAR-100 and Caltech-256 image datasets.

1) CIFAR-100: CIFAR-100 is a set of 60,000 color images from 100 pattern classes with 600 images per class. The 100 classes divide into 20 superclasses. Each superclass consists of 5 classes [14]. Each image has dimension 32×32×3. We used a 6-fold validation split with this dataset.

2) Caltech-256: This dataset had 30,607 images from 256 pattern classes. Each class had between 31 and 80 images. The 256 classes consisted of the two superclasses animate and inanimate. The animate superclass contained 69 patterns classes. The inanimate superclass contained 187 pattern classes [15]. We removed the cluttered images and reduced the size of the dataset to 29,780 images. We resized each image to 100×100×3. We used a 5-fold validation split with this case.

B. Network Description

We trained several deep neural classifiers on the CIFAR-100 and Caltech-256 datasets. The classifiers used 3,072 input neurons and K=100 if they trained on the CIFAR-100 data. All the classifiers we trained on the CIFAR-100 had 512 neurons per hidden layer. The hidden neurons used ReLU activations of the form a(x)=max(0,x) although logistic hidden units also performed well in blocks. We trained some classifiers with the ordinary BP [14], [16] and then further trained others with the deep-sweep method. We used dropout pruning method for the hidden layers [17]. A dropout value of 0.9 for the non-visible hidden layers reduced overfitting. We did not use a dropout with the visible hidden layers.

The neural classifiers differed when trained on the Caltech-256 dataset. We used 30,000 neurons at the input layer and K equals 256 of the deep classifiers trained on this dataset. All the models trained on Caltech-256 used 1,024 neurons per hidden layer with the ReLU activation. We varied the value of code length M for the models with the bipolar logistic activation such that $\log_2 256 \leq m \leq 256$. We trained some classifiers with the ordinary BP and others with the deep sweep method. The deep neural classifiers used 30,000 input neurons and M output neurons. Dropout pruned all the nonvisible hidden layers with a dropout value of 0.8. We did not use a dropout with the visible hidden layers.

C. Results and Discussion

Table I compares the effect of the output activations on the classification accuracy of deep neural classifiers. It shows that the logistic activations outperformed the softmax activation. We used the K-dimensional basis vectors as the codewords. FIG. 10 shows the result from training neural classifiers with different configurations. The figure shows that the logistic activation outperformed the softmax in all the cases we tested.

We used the random coding method in algorithm 1 to search for bipolar codewords. We varied the value of M and searched over 10,000 iterations for the best code C* with the minimum mean $$\mu_c^*.$$

FIG. 9 displays different sets of bipolar random codewords from algorithm 1 with p=0.5 and K=100. The codewords came from the bipolar Boolean cube $\{-1, 1\}^M$.

Figure 9A:
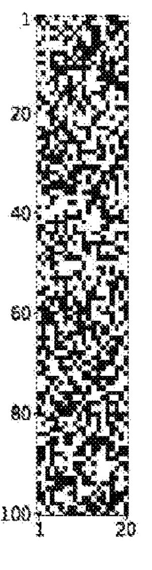
FIGS. 9A, 9B, 9C, and 9D: Bipolar codewords generated from the random coding method in Algorithm 1 with p=0.5, M≤100, and K=100. The algorithm found the set of codewords C* with the smallest mean $\mu_c$ of the inter-codeword similarity measure $d_{kl}$. We searched for the best of such random code words in 10,000 iterations. This figure shows the grayscale image of some of the codewords. The black pixels denote the bit value 1 and the white pixels denote the bit value −1. (A) shows the best code C* with M=20. (B) shows the best code C* with M=60. (C) shows the best code C* with M=100. (D) shows the 100 equidistant unit basis-vector codewords from the bipolar Boolean cube $\{-1, 1\}^{100}$ with M=100.
Figure 9B:
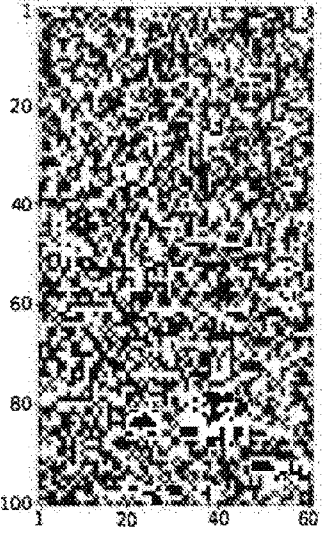
Figure 9C:
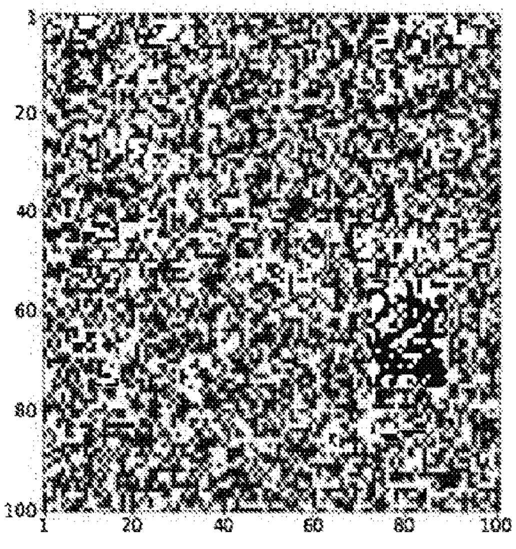
Figure 9D:
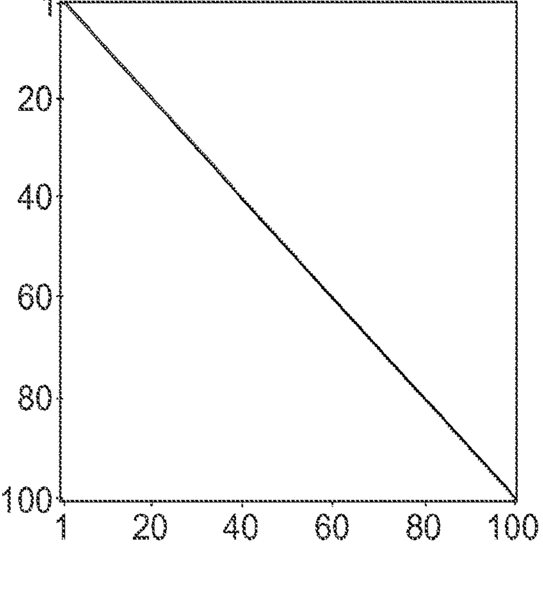
Figure 10A:
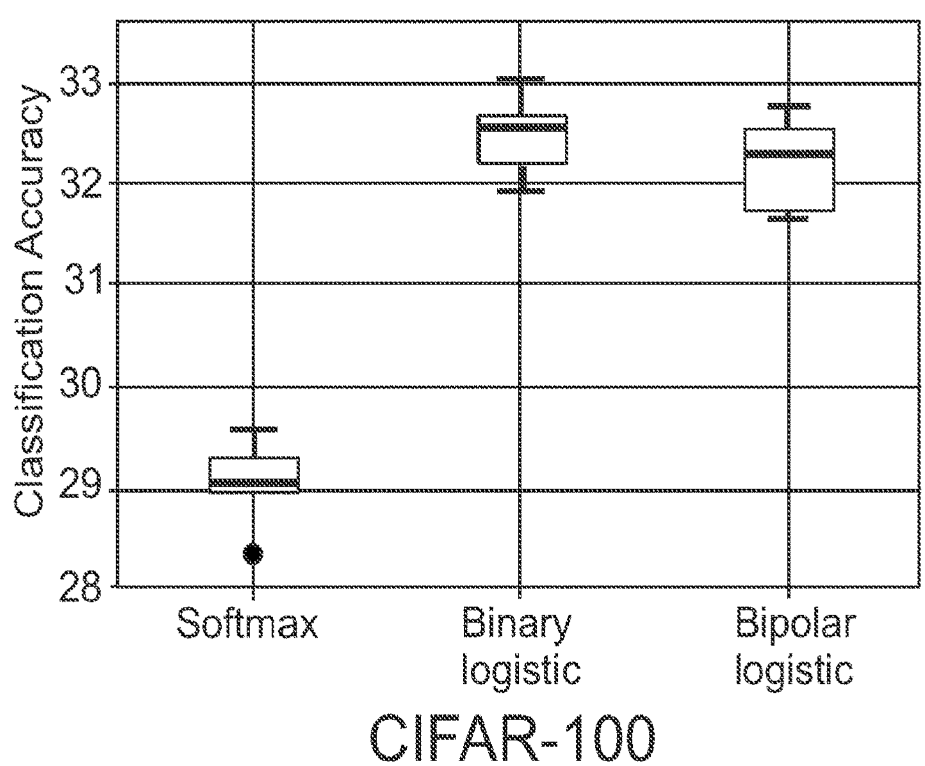
FIGS. 10A, 10B, 10C, and 10D: Logistic activations outperformed softmax activations for the same number K of output neurons. We compared the classifier accuracy of networks that used output softmax, binary logistic, and bipolar logistic neurons. Pattern coding used K binary basis vectors from the Boolean $\{0, 1\}^K$ as the codewords for softmax or binary logistic outputs. Coding used K bipolar basis vectors from the bipolar cube $\{-1, 1\}^K$ as the codewords for bipolar logistic outputs. Ordinary unidirectional backpropagation trained the networks. (A) shows the classification accuracy of the neural classifiers trained on the CIFAR-100 dataset with K=100 where each model used 5-hidden layers with 512 neurons each. (B) shows the performance of the best model for each activation type. (C) shows the classification accuracy of the neural classifiers trained on the Caltech-256 dataset with K=256 where each model used 7-hidden layers with 1,024 neurons each. (D) shows the performance of the best model (for each activation) with 7 hidden layers.
Figure 10B:
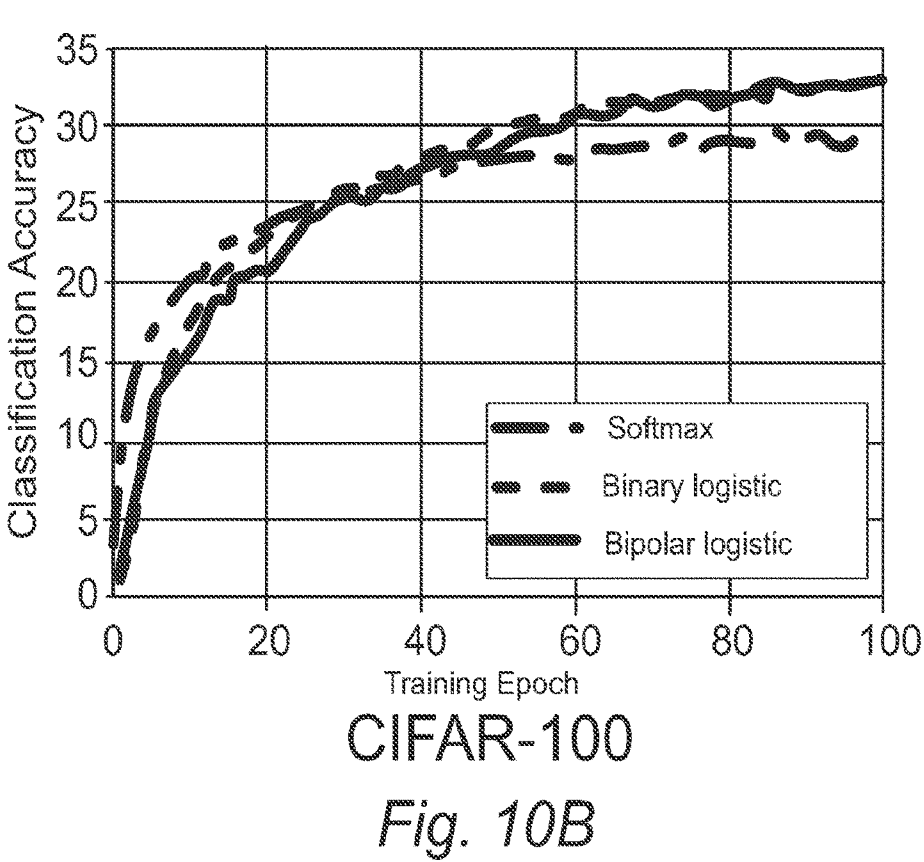
Figure 10C:
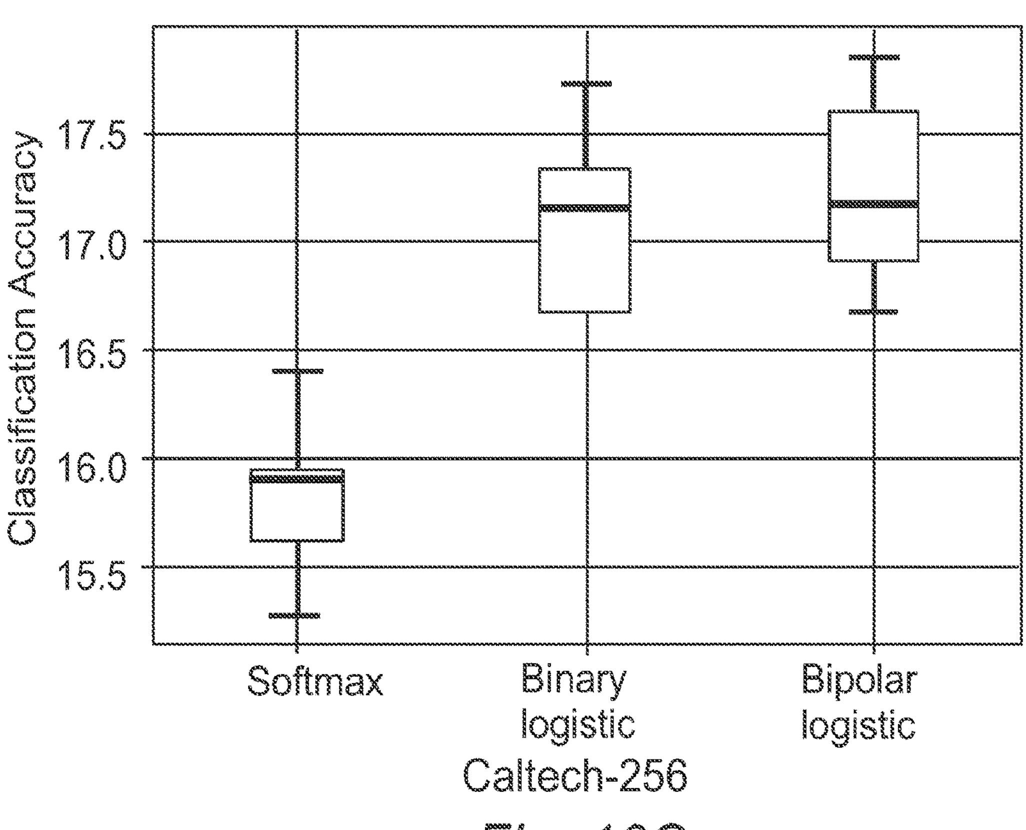
Figure 10D:
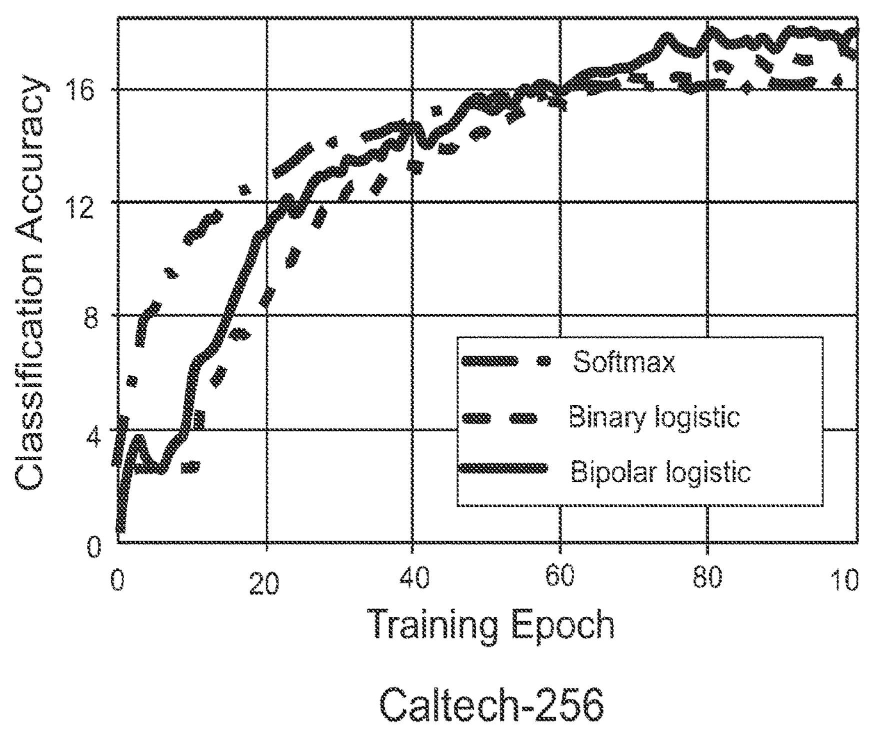
Figure 11A:
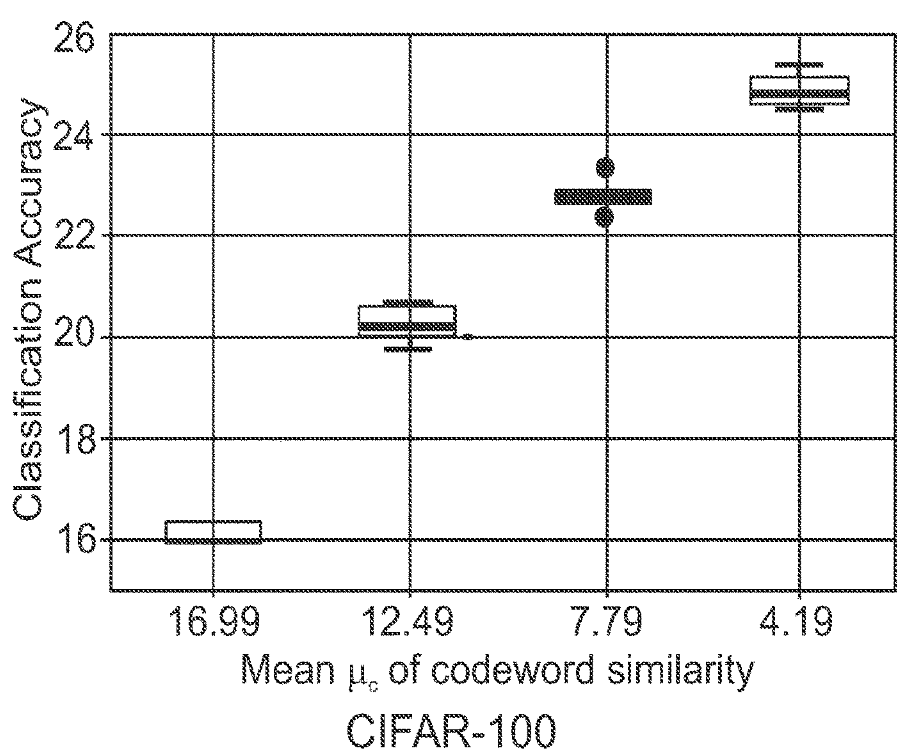
FIGS. 11A, 11B, 11C, and 11D: Random bipolar coding with neural classifiers. Classification accuracy fell with an increase in the mean $\mu_c$ of inter-codeword similarity measure for a fixed code length M. The trained neural classifiers used 5 hidden layers with 512 neurons each and had code length M=30 on the CIFAR-100 dataset. The trained neural classifiers used 5 hidden layers with 1,024 neurons each and had code length M=80 on the Caltech-256 dataset. The random coding method in Algorithm 1 picked the codewords. We compared the effect of $\mu_c$ on the classification accuracy. (A) shows the accuracy when training the classifiers with the codewords from Algorithm 1. (B) shows that the accuracy decreased with an increase in $\mu_c$ for a fixed code length M=30. (C) shows the accuracy when training the classifiers with the codewords from Algorithm 1. (D) shows that the accuracy decreased with an increase in $\mu_c$ for a fixed code length M=80.
Figure 11B:
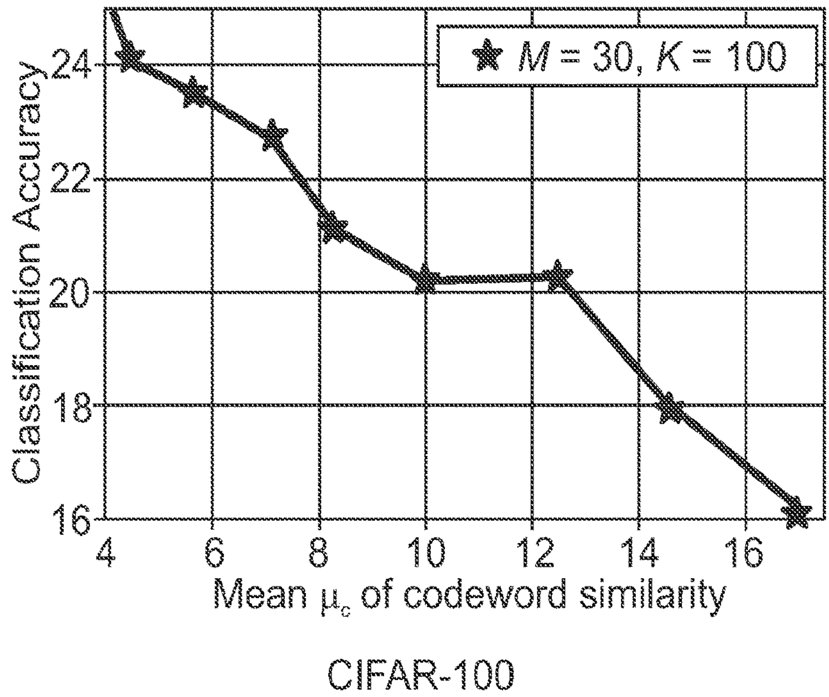
Figure 11C:
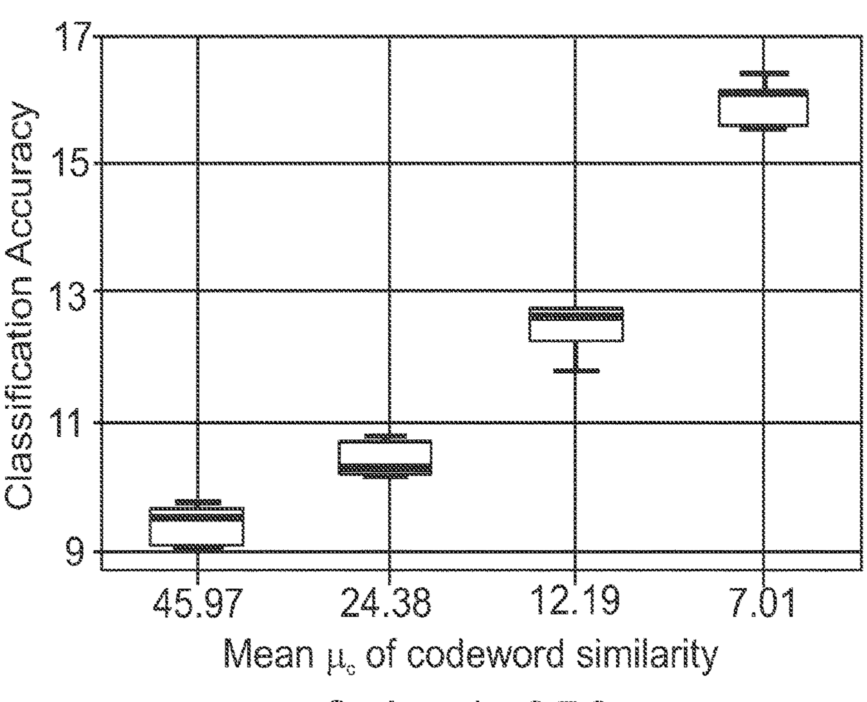
Figure 11D:
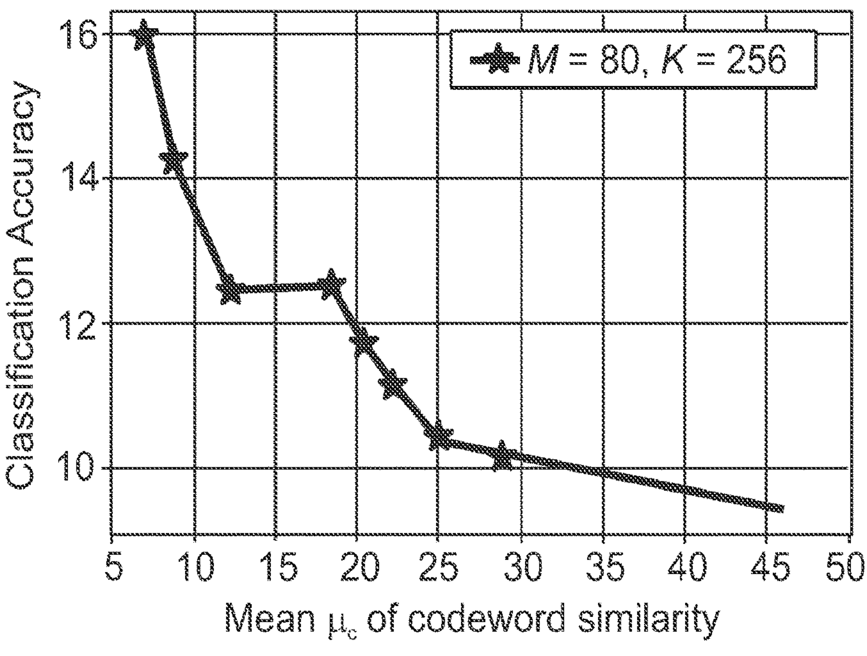
Figure 12A:
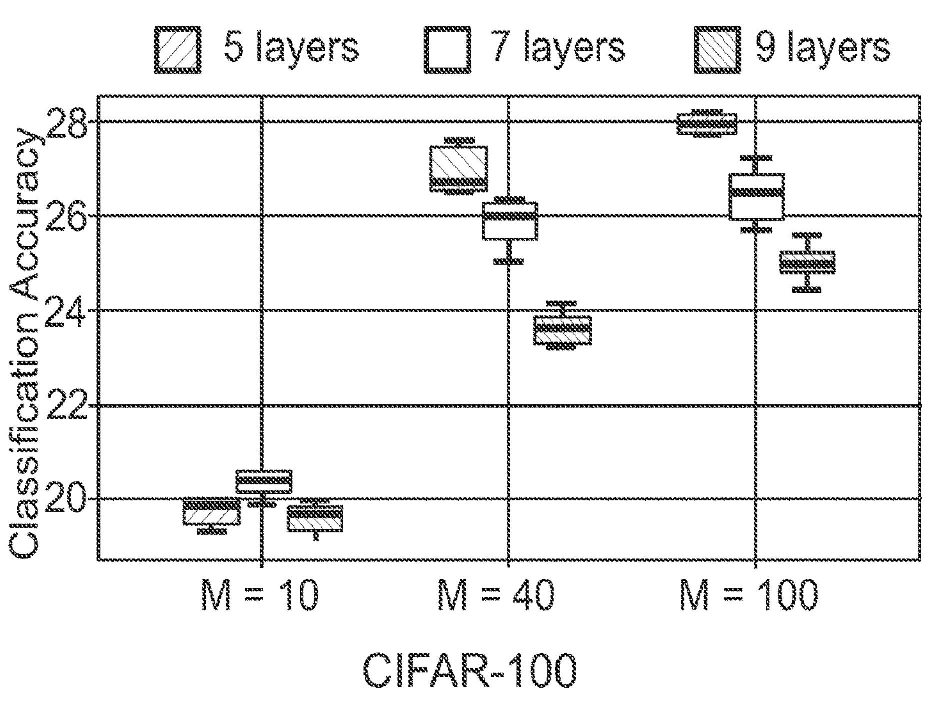
FIGS. 12A, 12B, 12C, and 12D: Random bipolar coding and ordinary BP. Algorithm 1 picked K codewords from $\{-1, 1\}^M$. The marginal increase in classification accuracy with an increase in the code length M decreased as M approached K. (A) shows the classification accuracy of the deep neural classifiers trained with the random bipolar coding (algorithm 1). (B) shows the classification accuracy of the neural classifiers with 5 hidden layers. The accuracy increased by 8.31% with an increase from M=10 to M=40 and the accuracy increased by 0.61% with an increase from M=40 to M=100. (C) shows the classification accuracy of the deep neural classifiers trained with codewords generated with random bipolar coding. (D) shows the classification accuracy of neural classifiers with 5 hidden layers. The accuracy increased by 4.92% with an increase from M=10 to M=80 and the accuracy increased by 0.40% with an increase from M=80 to M=200.
Figure 12B:
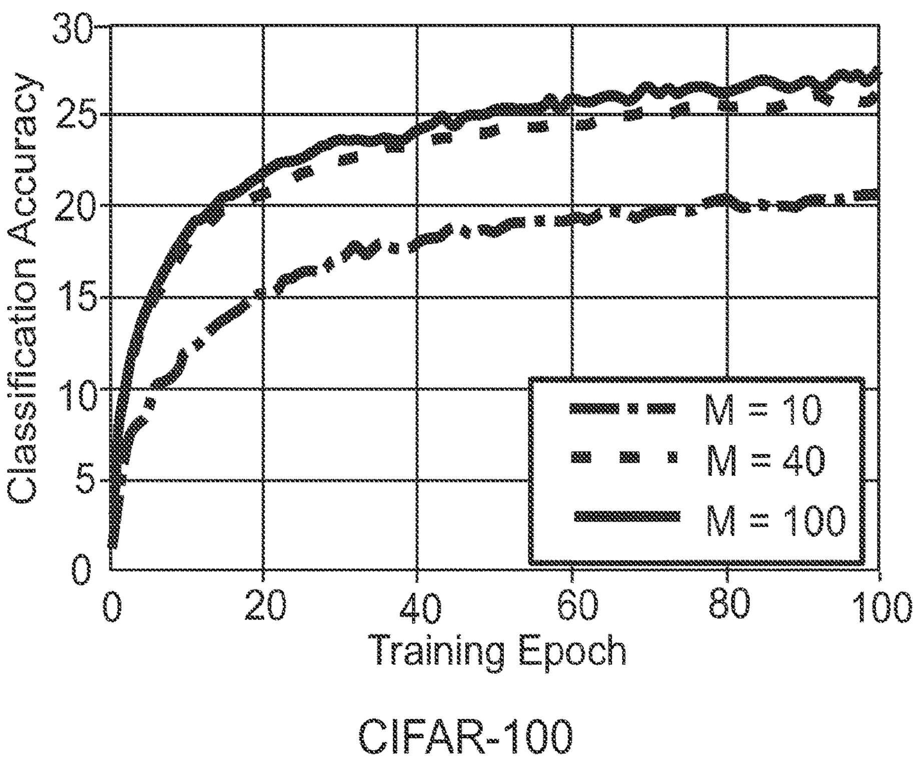
Figure 12C:
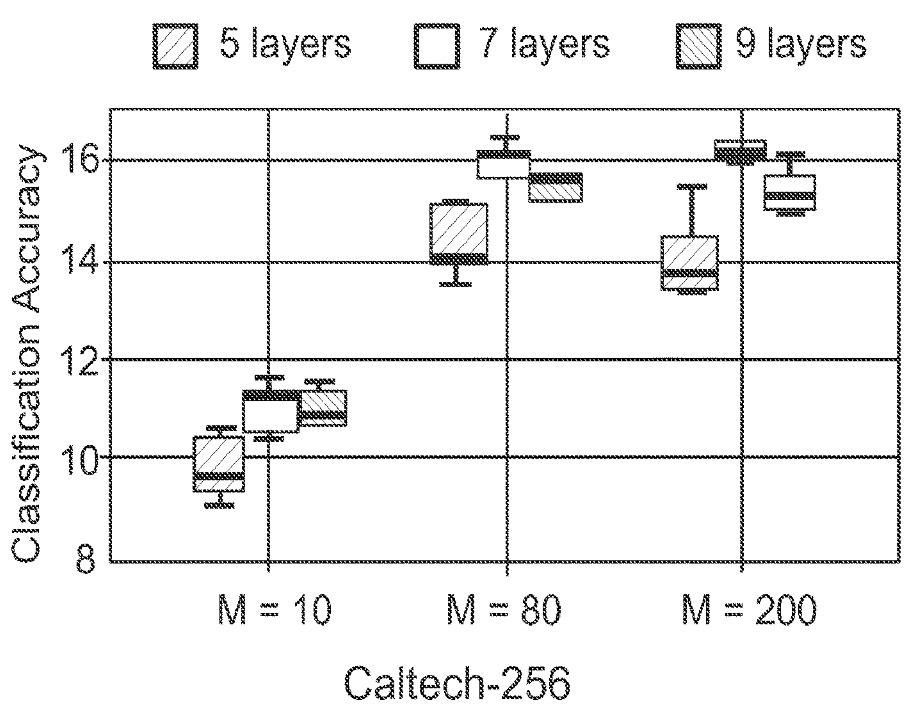
Figure 12D:
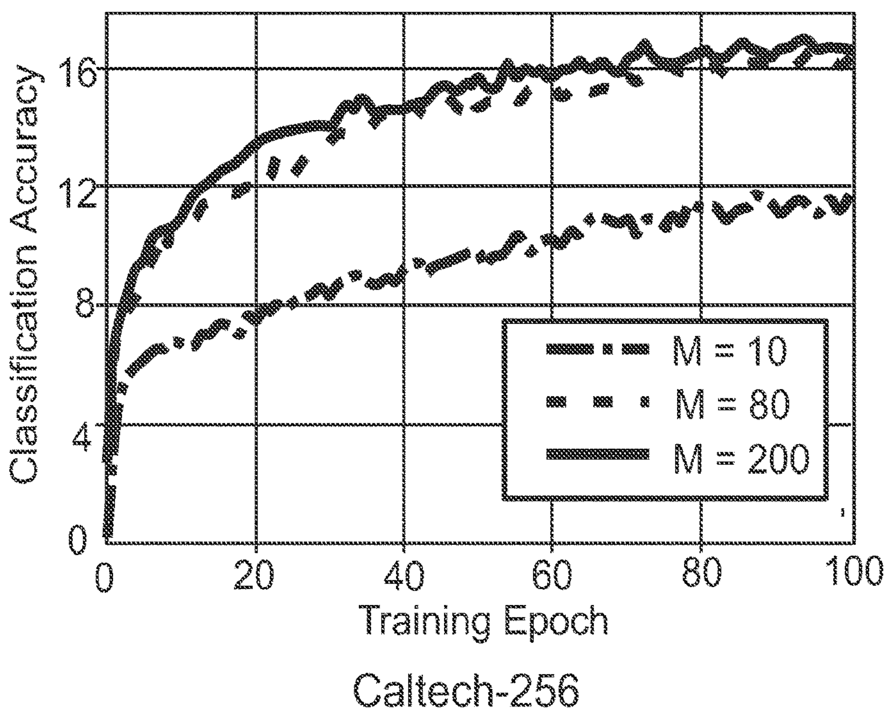

FIGS. 9A-9C show the respective bipolar codewords for code length 20, 60, and 100 using algorithm 1 FIG. 9D shows the bipolar basis vector with K=100 from $\{-1, 1\}^{100}$ Table II shows that decreasing the mean $\mu_c$ of code C increases the classification accuracy of the classifiers trained with the codewords. This is true when the length M of codewords is such that M<K. We also found the best set of codewords with p=0.5. FIG. 11 also supports this.

Table III shows that logistic networks can achieve high accuracy with small values of M. The table shows that the random codewords can achieve a comparable classification accuracy with a small code length M relative to the accuracy from training with the softmax output activation using K binary basis vectors from $\{0, 1\}^K$ as the codewords. It took M=40=0.4K to get between 88%-90% of the classification accuracy from using the softmax activation with M=K=100 on the CIFAR-100 dataset. It took M=80<0.32K to get between 84%-101% of the classification accuracy from using the softmax output activation (with M=K=256) on the Caltech-256 dataset. The random codes with M=80 outperformed the softmax activation with M=256 for neural classifiers with 5 or 7 hidden layers. FIG. 12 shows that the marginal increase in classification accuracy with an increase in the code length M decreases as M approaches K.

Figure 13A:
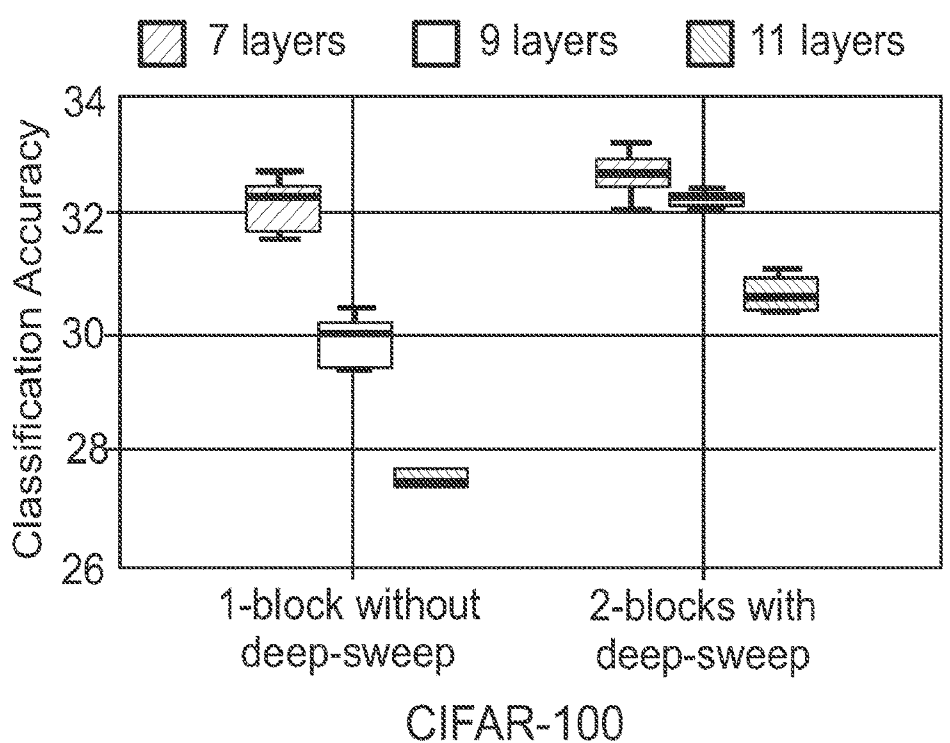
FIGS. 13A and 13B: Deep-sweep training method outperformed ordinary backpropagation. The deep neural classifiers used bipolar logistic functions for output activations. We used K bipolar basis vectors from the bipolar cube $\{-1, 1\}^K$ as the codewords with bipolar logistic outputs. We compared the effect of training with the deep-sweep method or ordinary backpropagation. Deep-sweep outperformed ordinary BP with deep networks. (A) shows the classification accuracy obtained from the classifiers with different sizes. (B) shows the classification accuracy obtained from the classifiers with different sizes.
Figure 13B:
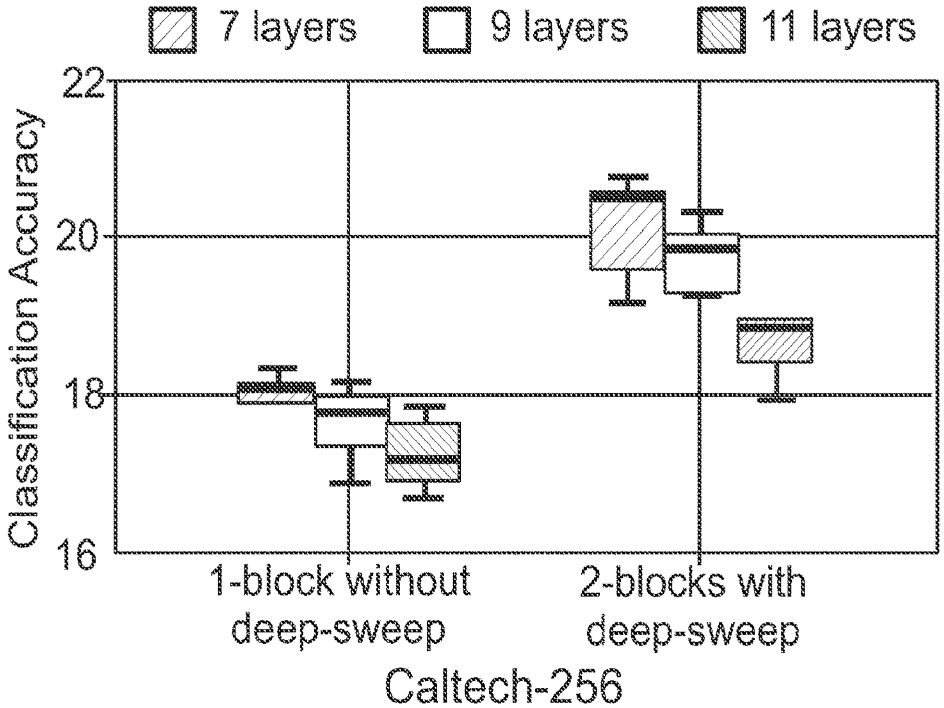

Table IV shows the benefit of training deep neural classifiers with the deep-sweep method in Algorithm 2. The deep-sweep training method reduces both the vanishing-gradient and slow-start problem. Simulations showed that the deep-sweep method improved the classification accuracy of deep neural classifiers. The deep-sweep benefit increases as the depth of the classifier increases. FIG. 13 also shows that the deep-sweep method outperformed ordinary BP with deep neural classifiers. Table V shows the relationship between the accuracy and the block size with the deep-sweep method. The relationship follows an inverted U-shape with a fixed number of blocks B.

Figure 14A:
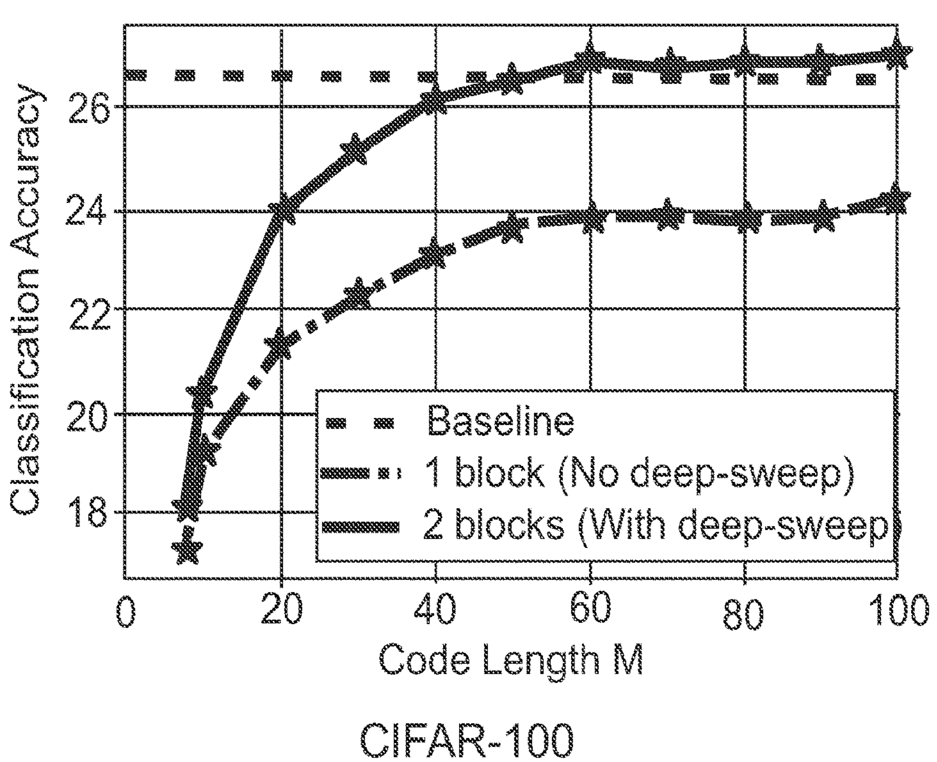
FIGS. 14A and 14B: Deep-sweep training with the random bipolar code search and (M<K) outperformed the baseline. The baseline is training with the combination of ordinary BP and softmax activation with the binary basis vectors from $\{0, 1\}^K$. We compared the effect of the deep-sweep method with code length M on the classification accuracy of deep neural classifiers. (A) show the performance of deep neural classifiers with 9 hidden layers and trained with the ordinary BP (no deep-sweep). It also show the performance of a 2-block network with 5 hidden layers per block and trained with the deep-sweep method (B) show the performance of deep neural classifiers with 11 hidden layers and the ordinary BP (no deep-sweep). It also show the performance of a 2-block network with 6 hidden layers per block and trained with the deep-sweep method.
Figure 14B:
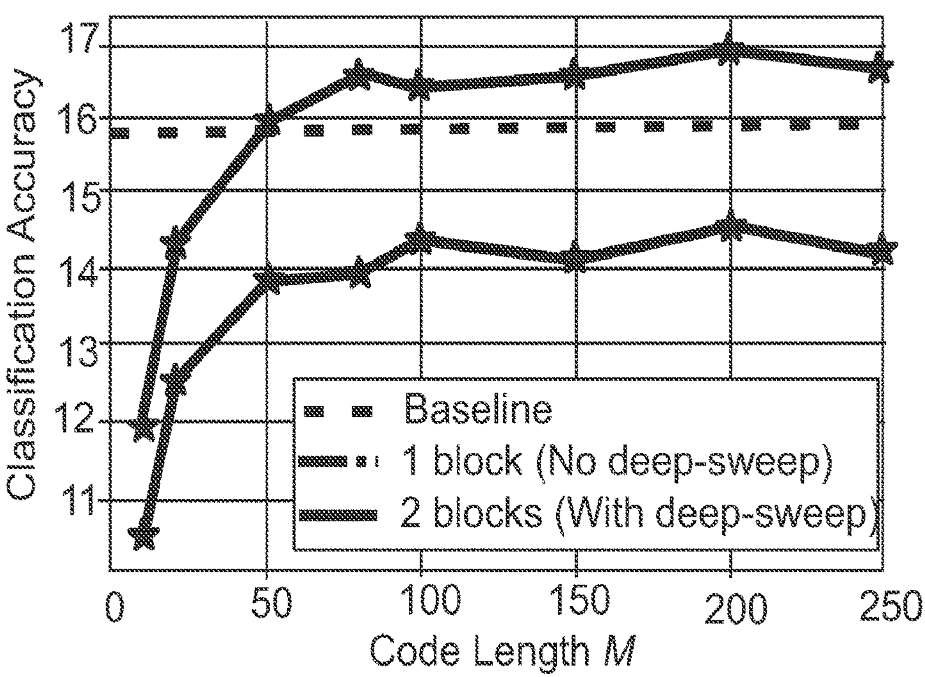

We also compared the effect of using the deep-sweep method and Algorithm 1 to pick the codewords. FIG. 14 shows that the deep-sweep and random coding method with M=40=0.4K outperformed training with the 100 basis vectors as the codewords (with softmax output activation) without the deep-sweep. We used the CIFAR-100 dataset with K=100 in this case. We also found the same trend with the models we trained on the Caltech-256 dataset. The combination of the deep-sweep and random coding method with M=80<0.32K outperformed training with basis vectors from $\{0, 1\}^K$ (as the codewords (with softmax output activation) with the ordinary BP.

III. Conclusion

Logistic output neurons with random coding allow a given deep neural classifier to encode and accurately detect more patterns than a network with the same number of softmax output neurons. The logistic output layer of a neural block uses length-M code words with $\log_2 K \leq M < K$. Algorithm 1 gives a simple way to randomly pick K reasonably separated bipolar codewords with a small code length M. Many other algorithms may work as well or better. Each block has so few hidden layers that there was no problem of vanishing gradients. The network instead achieved depth by adding more blocks. Deep-sweep training further outperformed ordinary backpropagation with deep neural classifiers. Application of bidirectional backpropagation [18]-[20] or proper noise-boosting [1], [2], [21], [22] improves deep-block behavior.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCES

[1] O. Adigun and B. Kosko, "Noise-boosted bidirectional backpropagation and adversarial learning," *Neural Networks*, vol. 120, pp. 9-31, 2019.

[2] B. Kosko, K. Audkhasi, and O. Osoba, "Noise can speed backpropagation learning and deep bidirectional pretraining," *To appear in Neural Networks,* 2020.

[3] B. Tgelnik and Y.-H. Pao, "Stochastic choice of basis functions in adaptive function approximation and the functional-link net," *IEEE Transactions on Neural Networks*, vol. 6, no. 6, pp, 1320-1329, 1995.

[4] A. N. Gorban, I. Y. Tyu kin, D. V. Prokhorov, and K. I. Sofeikov, "Approximation with random bases: Pro et contra," *Information Sciences*, vol. 364, pp. 129-145, 2016.

[5] P. Baldi and R. Vershynin, "The capacity of feedforward neural works," *Neural networks*, vol. 116, pp. 288-311, 2019.

[6] C. M. Bishop, Pattern recognition and machine learning. springer, 2006.

[7] K. Audhkhasi, O. Osoba, and B. Kosko. "Noise-enhanced convolutional neural networks," *Neural Networks*, vol. 78, pp. 15-23, 2016.

[8] B. Kosko, K. Audhkhasi, and O. Osoba, "Noise can speed backpropagation learning and deep bidirectional pre-training," *Neural Networks,* 2020.

[9] J. A. Gubner, Probability and random processes for electrical and computer engineers. Cambridge University Press, 2006.

[10] A. Leon-Garcia, "Probability, statistics, and random processes for electrical engineering," 2017.

[11] I. Goodfellow, Y. Bengio, and A. Courville, *Deep learning*. MIT press, 2016.

[12] J. Deng, A. C. Berg, K. Li, and L. Fei-Fei, "What does classifying more than 10,000 image categories tell us?" in *European conference on computer vision*. Springer, 2010, pp. 71-84.

[13] M. R. Gupta, S. Bengio, and J. Weston, "Training highly multiclass classifiers," *The Journal of Machine Learning Research*, vol. 15, no. 1, pp. 1461-1492, 2014.

[14] A. Krizhevsky, G. Hinton et al., "Learning multiple layers of features from tiny images," Citeseer, Tech. Rep., 2009.

[15] G. Grimn, A. Holub, and P. Perona, "Caltech-256 object category dataset," 2007.

[16] W. P. J., "Beyond regression: New tools for prediction and analysis in the behavioral sciences." *Doctoral Dissertation, Applied Mathematics*, Harvard University MA, 1974.

[17] N. Srivastava, U. Hinton, A. Krizhevsky, I. Sutskever, and R. Salakhutdinov. "Dropout: a simple way to prevent neural networks from overfitting," *The Journal of Machine Learning Research*, vol. 15, no. I, pp. 1929-1958, 2014.

[18] O. Adigun and B. Kosko, "Bidirectional representation and backpropagation learning," in *International Joint Conference on Advances in Big Data Analytics,* 2016, pp. 3-9.

[19] O. Adigun and B. Kosko, "Bidirectional backpropagation," *IEEE Transactions on Systems, Man, and Cybernetics: Systems*, vol. 50, no. 5, pp. 1982-1994, 2019.

[20] O. Adigun and B. Kosko, "Training generative adversarial networks with bidirectional backpropagation," in 2018 17*th IEEE International Conference on Machine Learning and Applications* (*ICMLA*). IEEE, 2018, pp. 1178-1185.

[21] O. Osoba and B. Kosko, "The noisy expectation-maximization algorithm for multiplicative noise injection," *Fluctuation and Noise Letters*, vol. 15, no. 01, p. 1650007, 2016.

[22] O. Adigun and B. Kosko, "Using noise to speed up video classification with recurrent backpropagation," in *International Joint Conference on Neural Networks*. IEEE, 2017, pp. 108-115.

What is claimed is:

1. A neural network architecture implemented by a computing device for classifying digitally encoded input data into a plurality of classifications or for neural network regression, the neural network architecture comprising:

an input block including an input block input neuron layer, an input block hidden neuron layer, and an input block output neuron layer;

an output block including an output block input neuron layer, an output block hidden neuron layer, and an output block output neuron layer; and at least one hidden block interposed between the input block and the output block, the at least one hidden block including a hidden block input neuron layer, a hidden block hidden neuron layer, and a hidden block output neuron layer, wherein each neuron of the input block output neuron layer, the output block input neuron layer, output block output neuron layer, the hidden block input neuron layer and the hidden block output neuron layer, independently applies a logistic activation function or an activation function that is the sum of a logistic activation function and a linear term or an activation function that is the sum of a logistic activation function and a quasi linear term, wherein the neural network architecture is encoded in non-transitory computer memory.

2. The neural network architecture of claim 1 wherein neuron weights are tuned to maximize a global likelihood or posterior.

3. The neural network architecture of claim 1 wherein pretrained blocks are formed by independently pre-training the input block, the output block, and the at least one hidden block before inclusion in the neural network architecture.

4. The neural network architecture of claim 3 wherein blocks can be added or deleted as needed.

5. The neural network architecture of claim 3 wherein after the pretrained blocks are assembled into the neural network architecture, the neural network architecture is trained by deep-sweep training.

6. The neural network architecture of claim 1 comprising 1 to 100 hidden blocks.

7. The neural network architecture of claim 1 wherein the input block, the output block, and the at least one hidden block each independently includes from 1 to 100 hidden neuron layers.

8. The neural network architecture of claim 1 wherein K classifications are encoded using selected codewords that are from a subset of $2^M$ codewords derived from a unit cube $[0, 1]^M$ wherein M is the dimension of the selected codewords.

9. The neural network architecture of claim 8 wherein at least K codeword with at least a $\mathrm{Log}_2$ K codelength are used for encoding.

10. The neural network architecture of claim 8 wherein the K classifications are encoded using a randomly selected subset of $2^M$ codewords derived from the unit cube $[0, 1]^M$ the dimension of the $2^M$ codewords.

11. The neural network architecture of claim 8 wherein the K classifications are encoded using random bipolar coding.

12. The neural network architecture of claim 8 wherein codewords are orthogonal or approximately orthogonal.

13. The neural network architecture of claim 1 wherein hidden block hidden neuron layers of the at least one hidden block apply an activation function that is the sum of a logistic activation function and a linear term or the sum of a logistic activation function and a quasi-linear term.

* * * * *